United States Patent
Basu et al.

(10) Patent No.: US 11,330,410 B2
(45) Date of Patent: May 10, 2022

(54) PATHSIDE COMMUNICATION RELAY (PCR) FOR COLLECTING AND DISTRIBUTING PATHSIDE DATA AMONG CLIENT DEVICES

(71) Applicant: Corning Research & Development Corporation, Corning, NY (US)

(72) Inventors: Santanu Basu, Menlo Park, CA (US); Donnell Thaddeus Walton, Redwood City, CA (US)

(73) Assignee: Corning Research & Development Corporation, Corning, NY (US)

( * ) Notice: Subject to any disclaimer, the term of this patent is extended or adjusted under 35 U.S.C. 154(b) by 328 days.

(21) Appl. No.: 16/264,498

(22) Filed: Jan. 31, 2019

(65) Prior Publication Data

US 2019/0306676 A1 Oct. 3, 2019

Related U.S. Application Data

(60) Provisional application No. 62/652,014, filed on Apr. 3, 2018.

(51) Int. Cl.
*H04W 4/02* (2018.01)
*H04W 4/40* (2018.01)
(Continued)

(52) U.S. Cl.
CPC ............ *H04W 4/40* (2018.02); *G08G 1/0112* (2013.01); *G08G 1/0116* (2013.01);
(Continued)

(58) Field of Classification Search
None
See application file for complete search history.

(56) References Cited

U.S. PATENT DOCUMENTS

| 4,311,876 A | 1/1982 | Endo et al. | |
| 6,337,754 B1 * | 1/2002 | Imajo | H04B 10/25752 398/115 |

(Continued)

FOREIGN PATENT DOCUMENTS

| CN | 101051418 A | 10/2007 |
| CN | 201166867 Y | 12/2008 |

(Continued)

OTHER PUBLICATIONS

Non-Final Office Action for U.S. Appl. No. 16/264,507, dated Mar. 3, 2020, 23 pages.
"Corning One Wireless Platform Specification Sheet CMA-271-AEN"; Corning Incorporated; (2013) 16 Pages.
Ayyapan et al, "Vehicular Ad Hoc Networks (VANET): Architectures, Methodologies and Design Issues", pp. 177-180, Proc. Iconstem (2016.

(Continued)

*Primary Examiner* — Scott M Sciacca
(74) *Attorney, Agent, or Firm* — C. Keith Montgomery

(57) ABSTRACT

Pathside communication relay (PCR) for collecting and distributing pathside data among client devices. The PCR collects client data from client devices (such as vehicles, pedestrians, and roadside infrastructure) and sensor data from sensors. The PCR processes the collected client data and sensor data and generates pathside data to be distributed among the client devices. In some examples, the PCR includes wireless telecommunication circuitry for distributing the pathside data over dedicated short-range communications (DSRC) signals using the Wireless Access in Vehicular Environments (WAVE) protocol and/or Cellular-Vehicle to everything (Cellular-V2X) communications. The pathside data can include location data of client devices and other objects, ambient conditions, traffic data, and other informa- (Continued)

tion to facilitate improved decision-making (such as collision avoidance) by client devices.

27 Claims, 19 Drawing Sheets

(51) Int. Cl.
*G08G 1/00* (2006.01)
*H04W 4/029* (2018.01)
*H04W 4/06* (2009.01)
*H04W 4/80* (2018.01)
*G08G 1/01* (2006.01)
*G08G 1/09* (2006.01)
*H04W 84/18* (2009.01)

(52) U.S. Cl.
CPC ........... *G08G 1/0141* (2013.01); *G08G 1/093* (2013.01); *H04W 4/026* (2013.01); *H04W 4/027* (2013.01); *H04W 4/029* (2018.02); *H04W 4/06* (2013.01); *H04W 4/80* (2018.02); *H04W 84/18* (2013.01)

(56) References Cited

U.S. PATENT DOCUMENTS

| | | | |
|---|---|---|---|
| 6,829,531 | B2 | 12/2004 | Lee |
| 7,848,278 | B2 | 12/2010 | Chen et al. |
| 8,665,789 | B2 | 3/2014 | Chen et al. |
| 8,902,080 | B2 | 12/2014 | Sugawara et al. |
| 9,077,720 | B2 | 7/2015 | Chen et al. |
| 9,547,986 | B1 | 1/2017 | Curlander et al. |
| 2010/0033347 | A1 | 2/2010 | Hayashi |
| 2011/0227757 | A1 | 9/2011 | Chen et al. |
| 2017/0023945 | A1 | 1/2017 | Cavalcanti et al. |
| 2017/0053530 | A1* | 2/2017 | Gogic ...................... H04L 67/12 |
| 2018/0035276 | A1 | 2/2018 | Kang et al. |
| 2018/0184270 | A1 | 6/2018 | Chun et al. |
| 2018/0192268 | A1 | 7/2018 | Xu et al. |
| 2018/0299274 | A1* | 10/2018 | Moghe ............... G01C 21/3635 |
| 2018/0336780 | A1 | 11/2018 | Ran et al. |
| 2019/0028897 | A1* | 1/2019 | Ying ..................... H04W 12/75 |
| 2019/0287396 | A1* | 9/2019 | Sayin .................. G08G 1/0116 |
| 2020/0005644 | A1 | 1/2020 | Ichimaru et al. |
| 2020/0100120 | A1* | 3/2020 | Oyabu ................ H04W 72/046 |

FOREIGN PATENT DOCUMENTS

| | | |
|---|---|---|
| CN | 102272809 | 12/2011 |
| CN | 103051726 A | 4/2013 |
| CN | 106210152 A | 12/2016 |
| CN | 106218614 A | 12/2016 |

OTHER PUBLICATIONS

Batistatos et al; "Mobile Telemedicine for Moving Vehicle Scenarios: Wireless Technolgoy Options and Challenges", J. Network and Computer Applications, vol. 35, pp. 1140-1150 (2012.
Chaubey, "Security Analysis of Vehicular Ad Hoc Networks (VANETs: A Comprehensive Study)"; International Journal of Security and its Applications, vol. 10(5), pp. 261-274 (2016.
Greene et al; "Corning One Wireless Platform All-Optical Networking", Corning Incorporation; Jul. 2015; 16 Pages.
Hadded et al; "TDMA-Based MAC Protocols for Vehicular Ad Hoc Networks: A Survey Qualitative Analysis and Open Research Issues", IEEE Communication Surveys & Tutorials, vol. 17, No. 4, Fourth Quarter 2015; pp. 2461-2492.
Hafeez; "Performance Analysis and Enhancement of the DSRC for VANETs Safety Applications", IEEE Transactions on Vehicular Technology, vol. 62(7) (2013.
Huang et al; "A Comprehensive Real-Time Traffic Map for Geographic Routing in VANETs", Applied Sciences, vol. 7(129), pp. 1-20 (2017.
Kamini et al, "VANET Parameters and Applications: A Review", Global J. Comp Sci Tech, vol. 10(7) (2010); 6 Pages.
Miao et al; "Performance Evaluation of IEEE 802.11p MAC Protocol in VANET Safety Applications", IEEE Wireless Comm and Networking Conf (2013); 6 Pages.
Mir et al; "LTE and IEEE 802.11p for Vehicular Networking: A Performance Evaluation", Eurasip J Wireless Comm and Networking (2014); 2014:89; 15 Pages.
Mukhopadhyay et al, "Feasibility and Performance Evaluation of VANET Techniques to Enhance Real-Time Emergency Healthcare Services", Proc. ICACCI (2016); 7 Pages.
NXP; "Intelligent Roadside Unit: Overview"; (2019) 3 Pages http://www.nxp.com/applications/solutions-for-the-iot-and-adas/automotive/adas-autonomous-driving/intelligent-roadside-unit:INTELLIGENTRSU.
Skordylis et al, "Delay-Bounded Routing in Vehicular Ad-Hoc Networks", ACM (2008); 10 Pages.
Ur Rehman et al; "Vehicular Ad-Hoc Networks (VANETs) An Overview and Challenges", J. Wireless Networking and Communications, pp. 29-38 (2013.
Final Office Action for U.S. Appl. No. 16/264,507, dated Jun. 18, 2020, 22 pages.
Non-Final Office Action for U.S. Appl. No. 16/264,522, dated Aug. 10, 2020, 13 pages.

* cited by examiner

PATHSIDE COMMUNICATION RELAY (PCR) FOR COLLECTING AND DISTRIBUTING PATHSIDE DATA AMONG CLIENT DEVICES

CROSS-REFERENCE TO RELATED APPLICATIONS

The present application claims priority under 35 U.S.C. § 119(e) to U.S. Provisional Patent Application Ser. No. 62/652,014 entitled "COMMUNICATIONS SYSTEM HAVING WIRELESS PATHSIDE COMMUNICATION RELAYS FOR DISTRIBUTING PATHSIDE INFORMATION AMONG VEHICLES" and filed on Apr. 3, 2018, which is incorporated herein by reference in its entirety.

This application is related to U.S. patent application Ser. No. 16/264,507, filed concurrently on Jan. 31, 2019 and entitled "PATHSIDE COMMUNICATION RELAY (PCR) FOR COLLECTING PATHSIDE DATA FOR A PCR NETWORK," which is incorporated by reference herein in its entirety.

This application is related to U.S. patent application Ser. No. 16/264,522, filed concurrently on Jan. 31, 2019 and entitled "PATHSIDE COMMUNICATION RELAY (PCR) FOR DISTRIBUTING NETWORK DATA AMONG CLIENT DEVICES," which is incorporated by reference herein in its entirety.

BACKGROUND

The disclosure relates to vehicular ad hoc networks (VANETs), and more particularly to a pathside communication relay (PCR) for collecting and distributing pathside data among client devices. The disclosure is applicable to vehicle to everything (V2X) communication, which includes communication among clients (e.g., vehicles, infrastructure, and other devices) along paths.

VANETs are created by applying the principles of mobile ad hoc networks—the spontaneous creation of a wireless network for data exchange—to the domain of vehicles. VANETs allow automobiles to form ad hoc communication networks between vehicles to exchange information, such as position, speed, direction of travel, and operating status (such as the application of brakes). VANETs can also include communication networks between vehicles and roadside infrastructure to provide road safety, navigation, and other roadside services. VANETs form a part of intelligent transportation systems (ITS) frameworks.

The Institute of Electrical and Electronic Engineers (IEEE) has incorporated IEEE 802.11p as an approved amendment to the 802.11 Wireless Fidelity (WiFi) standard, adding Wireless Access in Vehicular Environments (WAVE) as a vehicular communications protocol. The WAVE protocol stack includes data exchange between high-speed vehicles and between the vehicles and the roadside infrastructure in the licensed ITS band of 5.9 GHz (5.85-5.925 GHz). The WAVE protocol stack is designed to provide multi-channel operation (even for vehicles equipped with only a single radio), security, and lightweight application layer protocols.

The Dedicated Short Range Communication (DSRC) is a 300-1,000 meter (m) range ITS communications service that supports both public safety and private operations in vehicle to infrastructure (V2I) and vehicle to vehicle (V2V) communication modes. V2X is a commonly used term to include V2I, V2V, and any other communication with vehicles. The acronym for the communications protocol for this application is WAVE, which works with IEEE 1609 network layer and IEEE 802.11p access layer. The DSRC devices generally have a Global Navigation Satellite System (GNSS) antenna with location accuracy on the order of 1 m. Under DSRC, each vehicle generally broadcasts its core state information (e.g., location and other information such as engine conditions and brake positions) in a Basic Safety Message (BSM) once every 100 milliseconds (ms). Each vehicle also listens to BSM broadcasts from all other vehicles continuously. BSM can be sent in a 360° pattern. The DSRC units installed in vehicles can be referred to as On-Board Units (OBU). Some of the V2X devices are also mounted on roadside; these are called Roadside Units (RSU) or infrastructure units. Upon receipt of the BSM messages from other vehicles and the infrastructure, an OBU can build models of trajectory of neighboring vehicles, assess threats to the host vehicle, and warn a driver (or take action, such as automatically applying brakes) if a threat becomes acute. The instantaneous communications network that is formed among DSRC units located in cars and in roadside infrastructure is a VANET.

Recently, Cellular-V2X (C-V2X) has emerged as a competing technology to DSRC/WAVE. A C-V2X chipset based on Third Generation Partnership Project (3GPP) Release 14 Long Term Evolution (LTE)-V2X direct communication (C-V2X PC5) specifications has been introduced. Preliminary devices made with the chipset have recently been tested, however the C-V2X units are not yet available as standard items in any vehicle.

In this regard, FIG. 1 illustrates radio-bearing vehicles 100(1)-100(5) and roadside infrastructure 102 that are configured to form conventional VANETs. Each of the vehicles 100(1)-100(5) includes a vehicle radio frequency (RF) transmitter/receiver 104(1)-104(5) (e.g., OBU) to establish wireless V2X communications services with other vehicles 100(1)-100(5) and an RSU 102. Each vehicle RF transmitter/receiver 104(1)-104(5) creates a vehicle coverage area 106(1)-106(5) centered on the respective vehicle 100(1)-100(5). In an open space, the vehicle coverage area 106(1)-106(5) is typically circular (as depicted in FIG. 1) with the radius indicating the communication range of the vehicle RF transmitter/receiver 104(1)-104(5). However, in the presence of obstacles, such as buildings and trees along the path, the coverage area may be truncated. For example, in a straight section of a city road having buildings on each side, the coverage area is confined to be somewhat rectangular with the road width along one dimension, and approximately 600 m to 2,000 m along the length of the road, such as discussed further below with respect to FIG. 2B. In a conventional VANET, the RSU 102 includes an infrastructure RF transmitter/receiver 108, which creates an infrastructure coverage area 110 centered on the RSU 102, the infrastructure coverage area 110 in some cases being larger than a vehicle coverage area 106(1)-106(5) (which may similarly be truncated in the presence of buildings, trees, and other obstacles). Wireless communications services can be established between vehicles 100(1)-100(5) or between a vehicle 100(1)-100(5) and the RSU 102 having overlapping coverage areas 106(1)-106(5), 110. The RSU 102 may facilitate communication with roadside infrastructure 112 (depicted in FIG. 1 as a traffic signal).

Under a conventional VANET, a first vehicle 100(1) may establish communications with a second vehicle 100(2) where the vehicle coverage areas 106(1), 106(2) overlap. For example, if the first vehicle 100(1) changes into the lane of the second vehicle 100(2), the second vehicle 100(2) receives frequent timely updates on the first vehicle's 100(1) position, physical size, speed, and so on through the RF transmitter/receiver 104(2) (e.g., OBU), and can take corrective action if necessary to avoid collisions between the vehicles 100(1), 100(2).

In a similar manner, a third vehicle 100(3) may establish communications with the RSU 102 where the vehicle coverage area 106(3) of the third vehicle 100(3) overlaps with the infrastructure coverage area 110. For example, the RSU 102 may provide data on the number of vehicles 100(1)-100(5) it detects, along with the vehicles' 100(1)-100(5) speed and direction of travel to nearby roadside infrastructure 112 (e.g., the traffic signal). The RSU 102 may coordinate with the roadside infrastructure 112 to broadcast messages, such as to indicate the traffic signal is changing or about to change a traffic control state, to facilitate giving advance warning to a driver of the vehicle 100(3) and/or automated control of the vehicle 100(3).

The conventional VANETs of FIG. 1 may, however, have limited capability given their ad hoc nature and the limited size of the vehicle coverage areas 106(1)-106(5) and the infrastructure coverage area 110. The size of the coverage area is limited by the range of the V2X communication and by common objects such as trees and buildings along roads. The biggest shortcomings are (a) quality of service, such as communication drop offs, (b) inability to see traffic on cross streets, (c) limited range (300-1,000 m), (d) network security and right of user privacy, and (e) scalability. For example, it is desirable for the roadside infrastructure 102 to have information on the first vehicle 100(1) and the second vehicle 100(2) which are just outside its V2X communication range and which are about to enter its V2X communication range, such as to gauge a wider amount of traffic and/or transmit a traffic control state to vehicles 100(1), 100(2) which are farther away. It is similarly desirable for the first vehicle 100(1) to have information on the region served by the RSU 102, which is just outside its V2X communication range and which the first vehicle 100(1) is about to enter. In addition, if a fourth vehicle 100(4) experiences a mechanical failure, it may be desirable for the first vehicle 100(1) and/or the second vehicle 100(2), which are traveling towards the fourth vehicle 100(4), to be aware of the mechanical failure (e.g., to avoid turning and colliding with the fourth vehicle 100(4)).

In addition, as depicted in FIGS. 2A and 2B, in high-density vehicle traffic environments, conventional VANETs 200 may be complex and unreliable. FIG. 2A is a schematic diagram of radio-bearing vehicles 100(1)-100(6), illustrating an example of the number of connections 202 required to form a traditional VANET 200. As illustrated in FIG. 2A, the traditional VANET 200, which includes six vehicles 100(1)-100(6) in a region of a vehicle path, can require a vehicle 100(1) to establish an individual connection 202 with each surrounding vehicle 100(2)-100(6), with each vehicle 100(2)-100(6) doing the same. Accordingly, in the example depicted, with only six vehicles 100(1)-100(6), the VANET 200 includes fifteen (15) connections 202 in an environment in which many of these connections 202 may need to be quickly established. Thus, the traditional VANET 200 can be unreliable, where there can be too little time to establish so many connections 202 and exchange needed information in an ad hoc manner.

FIG. 2B is another schematic diagram of radio-bearing vehicles 100(1)-100(17), illustrating the limitations of effective communication ranges under the conventional VANETs of FIG. 1. Under the conventional VANET approach, WAVE communications are transmitted over the ITS band of 5.9 GHz, which has poor propagation through buildings and other large objects. Accordingly, a first radio-bearing vehicle 100(1) may have an effective communication range 204 which extends along its path of travel, but not around corners. Thus, the first radio-bearing vehicle 100(1) is able to communicate with radio-bearing vehicles 100(2)-100(4) within the effective communication range 204, but would not be able to communicate with radio-bearing vehicles 100(12)-100(15) around an upcoming intersection, increasing a likelihood of a collision at the intersection. According to a Federal Highway Administration report, intersection crashes amount to 40% of all vehicle crashes and 21% of all vehicle related fatalities. Conventional VANETs are insufficient to reduce accidents and vehicle related fatalities near street intersections.

No admission is made that any reference cited herein constitutes prior art. Applicant reserves the right to challenge the accuracy and pertinency of any cited documents.

SUMMARY

Embodiments disclosed herein include a pathside communication relay (PCR) for collecting and distributing pathside data among client devices. In an exemplary aspect, a PCR is positioned along a vehicle path and is capable of transmitting and receiving wireless signals within a communication coverage area (which may include a region of the vehicle path). The PCR can collect client data from client devices (such as vehicles, pedestrians, and roadside infrastructure) and sensor data from sensors. The PCR processes the collected client data and sensor data (e.g., to determine a relevant portion to be distributed) and generates pathside data to be distributed among the client devices. In some examples, the PCR includes vehicle to everything (V2X) wireless telecommunication circuitry for distributing the pathside data over dedicated short-range communications (DSRC) signals using the Wireless Access in Vehicular Environments (WAVE) protocol and/or Cellular-V2X (C-V2X) signals using the C-V2X communications protocol. The pathside data can include location data of client devices and other objects (e.g., position, orientation, speed, and/or operating status of vehicles), ambient conditions, traffic data, and other information to facilitate improved decision-making (such as collision avoidance) by client devices. In this manner, client devices in a communication coverage area of the PCR can obtain information from a number of nearby client devices (including vehicles), roadside infrastructure, and other communications equipment without the need to establish numerous communications links.

In one exemplary aspect, a PCR is provided. The PCR includes a communication interface circuit configured to establish a communication coverage area. The PCR also includes a sensor interface circuit configured to couple to a sensor. The PCR also includes a processing circuit configured to receive client data from a client device within the communication coverage area over the communication interface circuit and receive sensor data from the sensor through the sensor interface circuit. The processing circuit is also configured to cause pathside data to be generated based on the client data and the sensor data, and transmit the pathside data within the communication coverage area through the communication interface circuit.

An additional embodiment of the disclosure relates to a method for communicating with client devices within a vehicle path. The method includes receiving client data from a first client device within the vehicle path over a wireless communication medium and receiving sensor data from a sensor. The client data and the sensor data are processed to produce pathside data, and the pathside data is transmitted to a region of the path.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include a pathside communication relay (PCR) for collecting and distributing pathside data among client devices. In an exemplary aspect, a PCR is positioned along a vehicle path and is capable of transmitting and receiving wireless signals within a communication coverage area (which may include a region of the vehicle path). The PCR can collect client data from client devices (such as vehicles, pedestrians, and roadside infrastructure) and sensor data from sensors. The PCR processes the collected client data and sensor data (e.g., to determine a relevant portion to be distributed) and generates pathside data to be distributed among the client devices. In some examples, the PCR includes vehicle to everything (V2X) wireless telecommunication circuitry for distributing the pathside data over dedicated short-range communications (DSRC) signals using the Wireless Access in Vehicular Environments (WAVE) protocol and/or Cellular-V2X (C-V2X) signals using the C-V2X communications protocol. The pathside data can include location data of client devices and other objects (e.g., position, orientation, speed, and/or operating status of vehicles), ambient conditions, traffic data, and other information to facilitate improved decision-making (such as collision avoidance) by client devices. In this manner, client devices in a communication coverage area of the PCR can obtain information from a number of nearby client devices (including vehicles), roadside infrastructure, and other communications equipment without the need to establish numerous communications links.

Figure 3:
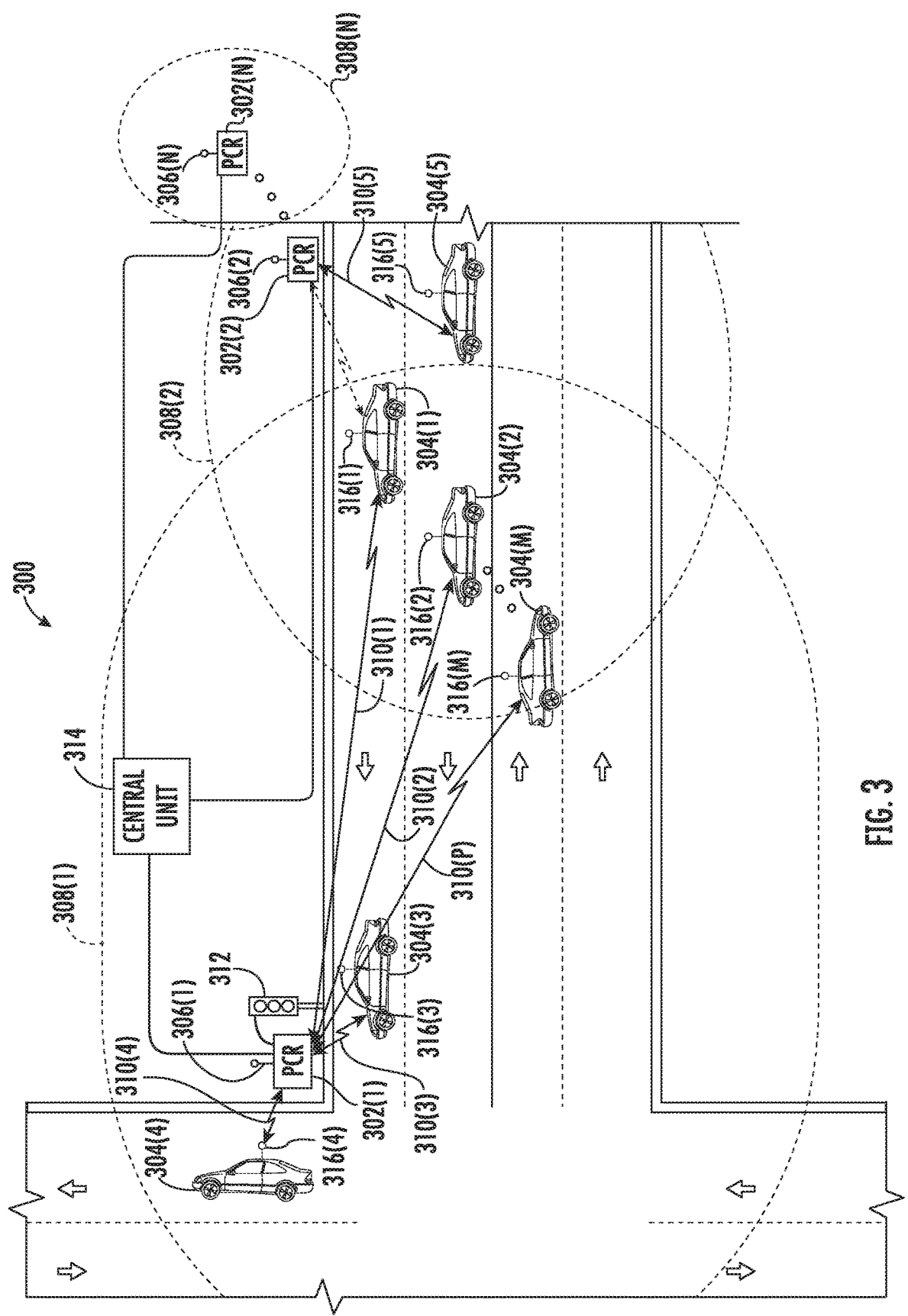
FIG. 3 is a schematic diagram of an exemplary pathside communication relay (PCR) network which includes one or more PCRs which collect and distribute pathside data to client devices in a vehicle path adjacent the PCRs.

In this regard, FIG. 3 is a schematic diagram of an exemplary PCR network 300 which includes one or more PCRs 302(1)-302(N) which collect and distribute pathside data to client devices 304(1)-304(M) in a vehicle path adjacent the PCRs 302(1)-302(N). The notation "1-N" indicates that any number of PCRs, 1-N, may be provided, and the notation "1-M" indicates that any number of client devices, 1-M, may be present. In an exemplary aspect, the client devices 304(1)-304(M) can include vehicles as depicted in FIG. 3, but may also include mobile devices, wearable devices, bicycles, traffic signals, and other devices adjacent the vehicle path. Each PCR 302(1)-302(N) incorporates a communication interface circuit 306(1)-306(N) (e.g., wireless V2X telecommunication circuitry such as a radio frequency (RF) transmitter/receiver) configured to create a communication coverage area 308(1)-308(N) centered on the respective PCR 302(1)-302(N). In exemplary aspects, a PCR 302(1)-302(N) is positioned adjacent one or more vehicle paths (e.g., a road or series of roads), and its communication coverage area 308(1)-308(N) extends along the vehicle path. The PCR network 300 can incorporate multiple PCRs 302(1)-302(N) along the vehicle path such that the respective communication coverage areas 308(1)-308(N) overlap or otherwise facilitate relaying pathside data along substantially the entire vehicle path. The PCR network 300 may also be referred to herein as a pathside communications system.

Each PCR 302(1)-302(N) is configured to receive pathside data from a surrounding region of the vehicle path, which can include its respective communication coverage area 308(1)-308(N). The pathside data can include client data, such as the position, orientation, speed, and/or operating status of nearby client devices (e.g., vehicles) 304(1)-304(M), which can be received by the PCR 302(1)-302(N) from the client devices 304(1)-304(M) within its respective communication coverage area 308(1)-308(N) via wireless signals (e.g., RF signals) 310(1)-310(P) over the respective communication interface circuit 306(1)-306(N). The notation "1-P" indicates that any number of wireless signals, 1-P, may be provided. In some cases, pathside data, including client data, can also be received from cameras, environmental sensors, traffic control devices 312, and other sensors coupled to the PCR 302(1)-302(N), such as described further below with respect to FIG. 4.

The pathside data can then be distributed to client devices 304(1)-304(M) within the vehicle path through the PCRs 302(1)-302(N). In an exemplary aspect, a first PCR 302(1) receives client data (e.g., via wireless signals 310(1)-310(P)) from multiple client devices 304(1)-304(M) within a first communication coverage area 308(1) (e.g., a first region of the vehicle path). The first PCR 302(1) processes the client data (e.g., to identify relevant portions of client data received from a first client device 304(1) for a second client device 304(2), extract positional information, generate a map of client devices 304(1)-304(M) and other objects, remove identifying information, and so on) to produce pathside data. The pathside data may also include sensor data from sensors coupled to the first PCR 302(1) (e.g., sensor data which is relevant to the second client device 304(2)) and/or traffic control data received from the traffic control devices 312. The first PCR 302(1) can then transmit the pathside data via the wireless signals 310(1)-310(P) to the client devices 304(1)-304(M) within the first communication coverage area 308(1). The pathside data may be broadcast to the first communication coverage area 308(1). In some cases, the pathside data can be selectively distributed to a subset of the client devices 304(1)-304(M). For example, the first PCR 302(1)-302(M) may broadcast pathside data at intervals (e.g., periodically or irregularly) to all client devices 304(1)-304(M) within the first communication coverage area 308(1). The pathside data may be updated multiple times per second.

In another exemplary aspect, the first PCR 302(1) can also transmit a portion, subset, or all of the pathside data it has collected to the PCR network 300, such as to a second PCR 302(2). The PCR network 300 can also include a central unit 314 communicatively coupled to two or more of the PCRs 302(1)-302(N), which may facilitate distributing pathside data among the PCRs 302(1)-302(N) and/or provide the PCRs 302(1)-302(N) with additional information. The central unit 314 may include a pathside control module which can determine whether pathside data received by a first PCR 302(1) is relevant to client devices 304(1)-304(M) and/or roadside infrastructure in communication with a second PCR 302(2) (e.g., client devices 304(1)-304(M) within the second communication coverage area 308(2), which may be a second region of the vehicle path). When the pathside data is determined to be relevant to the second PCR 302(2), the central unit 314 routes at least some of the pathside data to the second PCR 302(2) to be distributed to a client device 304(3), as further described below. The data relevancy may be determined at the PCR 302(1)-302(N) or at the central unit 314. In some instances, the first PCR 302(1) may deem it necessary (e.g., via its pathside control module) to have part of the pathside data collected by the second PCR 302(2), and it may request the central unit 314 to supply the needed pathside data. In some examples, a first portion of the pathside data may be routed to the second PCR 302(2) and a second portion of the pathside data may be routed to another device in the PCR network 300 and not to the second PCR 302(2). This routing may be static, such as by being established at time of installation. The routing may also be dynamic, such that it can be changed frequently or otherwise as needed. In some cases, additional wireless communications services may also be distributed to the client devices 304(1)-304(M) through the PCRs 302(1)-302(N), such as cellular and/or internet services.

Figure 1:
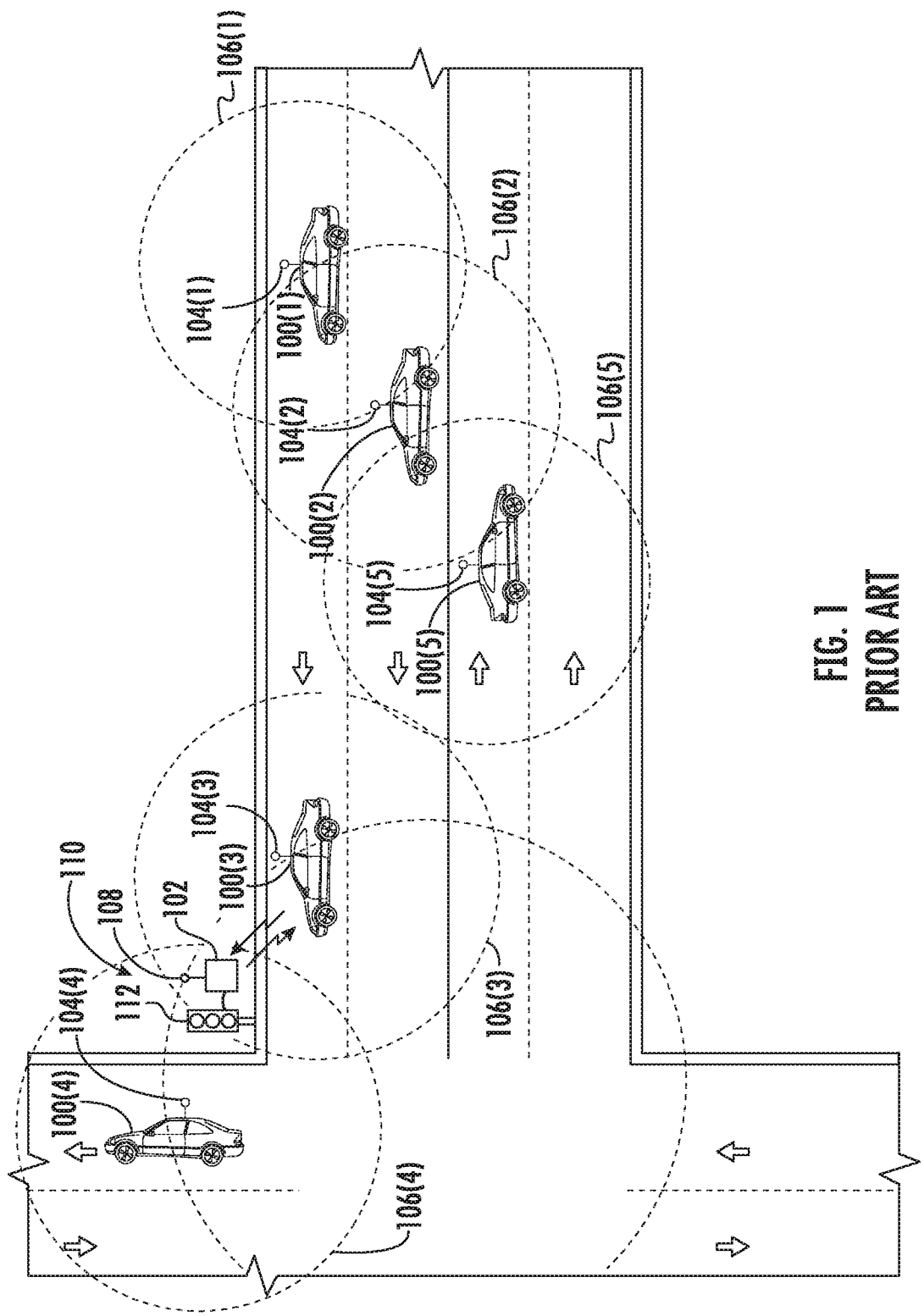
FIG. 1 is a schematic diagram of radio-bearing vehicles and roadside infrastructure that are configured to form conventional vehicular ad hoc networks (VANETs)

In this regard, FIG. 3 illustrates client devices 304(1)-304(M) within and/or traveling along a vehicle path, at least some of which are in communication with a PCR 302(1)-302(N) adjacent the vehicle path. In the illustrated embodiment, each client device 304(1)-304(M) is an automobile traveling along a road, and at least some of the client devices 304(1)-304(M) incorporate a client V2X RF transmitter/receiver 316(1)-316(M) (e.g., an On-Board Unit (OBU)) or other communication circuitry to establish wireless V2X communications services with other client devices 304(1)-304(M) and roadside infrastructure, such as the PCRs 302(1)-302(N). Each client V2X RF transmitter/receiver 316(1)-316(M) may also create a V2X client coverage area (similar to the vehicle coverage areas 106(1)-106(5) depicted with respect to vehicles 100(1)-100(5) in FIG. 1), which is omitted from FIG. 3 for clarity. Each PCR 302(1)-302(N) and its communication interface circuit 306(1)-306(N) is configured to communicate with client devices 304(1)-304(M) over Dedicated Short-Range Communication (DSRC) signals (such as described in CEN and ISO standards, including EN 12253:2004, EN 12795:2002, EN 12834:2002, EN13372:2004, and EN ISO 14906:2004) using IEEE 802.11p Wireless Access in Vehicular Environments (WAVE) protocol within its respective communication coverage area 308(1)-308(N) via wireless signals 310(1)-310(P) to relay pathside data, network data, and/or other communications services. The PCR 302(1)-302(N) can thus communicate with client devices 304(1)-304(M) through DSRC signals transmitted over the intelligent transportation systems (ITS) band of 5.9 GHz (5.85-5.925 GHz). The communication interface circuit 306(1)-306(N) may include an RF receiver circuit and an RF transmitter circuit, which form the communication coverage areas 308(1)-308(N) (e.g., RF coverage areas), as well as to receive and transmit DSRC communication signals, respectively. The communication interface circuit 306(1)-306(N) may also include a Global Navigation Satellite System (GNSS) receiver to gather location data, an internal processor for data processing, Controller Area Network (CAN) interfaces to the car diagnostics and computing system, electronic communication (e.g., Ethernet) interfaces to external devices and antennas for the RF transceivers and for the GNSS receiver. In some cases, the communication interface circuit 306(1)-306(N) can additionally or alternatively communicate with client devices 304(1)-304(M) over C-V2X signals, and the RF receiver circuit and the RF transmitter circuit may include cellular radio circuitry. The C-V2X signals can be deployed over cellular RF frequency bands, such as second generation (2G) frequency bands, third generation (3G) frequency bands, Long Term Evolution (LTE) frequency bands, fourth generation (4G) frequency bands, or fifth generation (5G) new radio (NR) frequency bands. In some cases, the communication interface circuits 306(1)-306(N) can communicate over other RF frequency bands (e.g., citizens broadband radio service (CBRS) frequency bands), over mmWave frequencies (e.g., 60-80 GHz), over optical frequencies (e.g., 230 THz), and so on.

For exemplary purposes, FIG. 3 is depicted with automobiles traveling along a road to illustrate client devices 304(1)-304(M) and vehicle paths. It should be understood that embodiments described herein are not limited to automobiles. In other aspects disclosed herein, the PCR network 300 can distribute pathside data to boats or ships within waterways (e.g., canals or rivers) or near docks, trains traveling along train tracks, pedestrians and/or bicycles on sidewalks, trails, and roads, animals to which a DSRC or C-V2X radio is attached, unmanned aerial vehicles (e.g., drones), helicopters, balloons, and other aircraft in airspace, carts in a mine, oil or excavation drills underground or underwater, underwater autonomous vehicles, roadside businesses and shopping centers, residents near roads, hospitals, traffic management systems, sensors for monitoring traffic, shipping containers, and/or chemical or environmental sensors, as examples.

Figure 4:
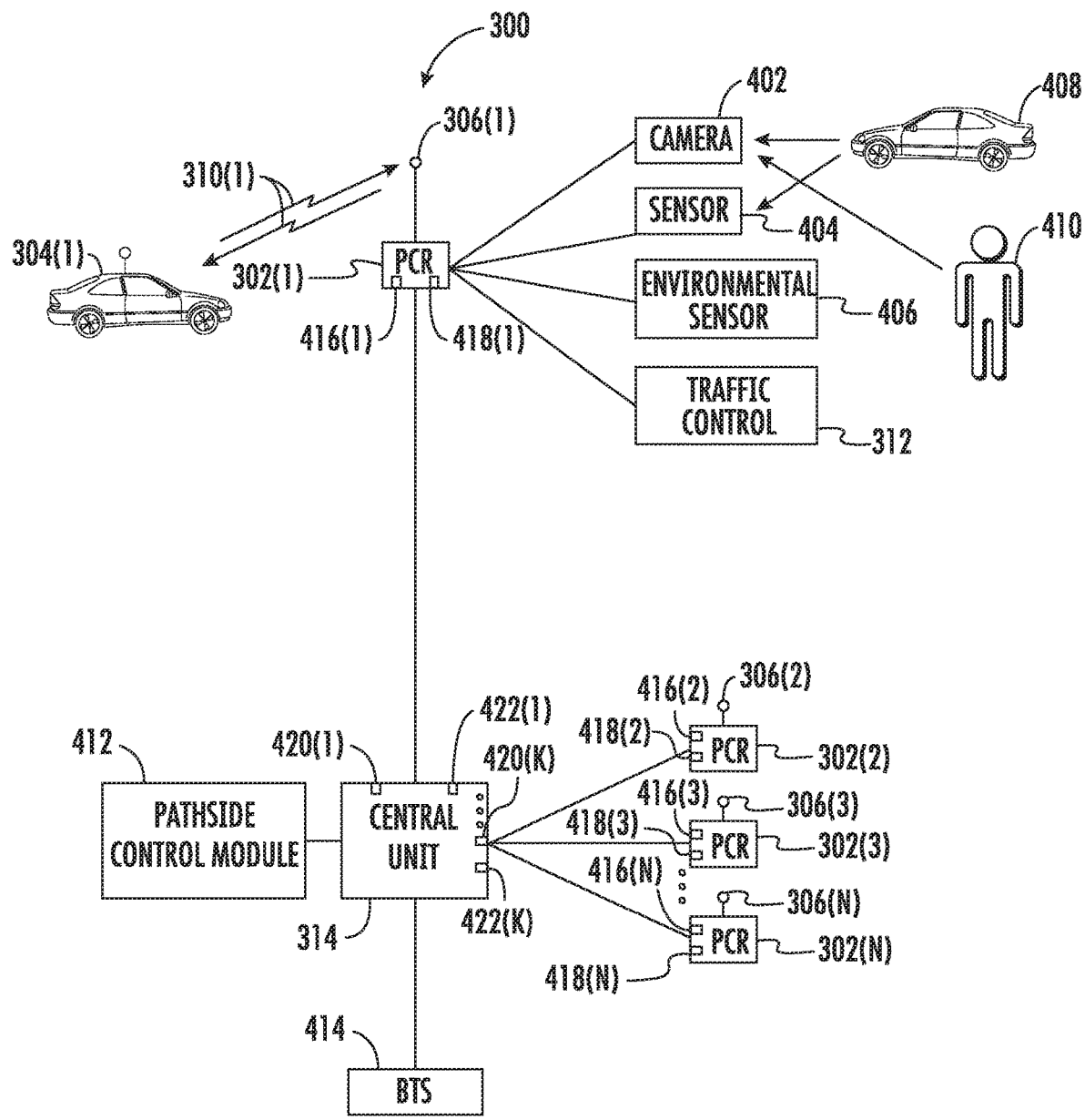
FIG. 4 is a schematic diagram of a portion of the PCR network of FIG. 3, illustrating exemplary sensors and devices which may provide additional pathside data to the PCRs.

Turning to FIG. 4, the PCR 302(1)-302(N) can receive pathside data from its communication interface circuit 306(1)-306(N), as well as through traffic monitoring devices, traffic control devices, and/or sensors. FIG. 4 is a schematic diagram of a portion of the PCR network 300, illustrating exemplary sensors and devices which may provide additional pathside data to the PCRs 302(1)-302(N). In an exemplary aspect, the first PCR 302(1) can be connected to traffic monitoring devices adjacent the region of the vehicle path covered by the first PCR 302(1) and/or its communication coverage area 308(1), such as a camera 402 and/or other sensor 404, a traffic control device 312, and/or an environmental sensor 406 to provide additional pathside data. In some examples, such traffic monitoring devices can be part of and/or integrated with the first PCR 302(1) in a sensor suite. Other PCRs 302(2)-302(N) can be similarly connected to sensors and other devices.

Pathside data can be any information regarding a vehicle path, or portion thereof, which may be significant to traveling vehicles, pedestrians, government agencies, or other client devices 304(1)-304(M). As an example, client data is provided to the first PCR 302(1) from client devices incorporating DSRC units, such as client device 304(1). The client data can include the client device's 304(1) position, orientation, speed, acceleration, direction of travel, size, and/or an operating status of the client device 304(1). The operating status of the client device 304(1) can be any condition or status of the client device (e.g., vehicle) 304(1), such as an application of brakes, a turn signal, an upcoming change in direction (e.g., based on a vehicle navigation program), an upcoming lane change, a distress condition, a motor condition, a tire condition, and so on. For a non-radio bearing vehicle 408 or other object, similar data may be obtained through sensor data from the camera 402 or other sensor 404. The sensor data may include image data (e.g., still or video data) collected from the camera 402, such as data on pedestrians 410, ambient conditions (e.g., rain, icy roads), and other image data. The sensor data may additionally or alternatively include data on ambient conditions provided through the environmental sensor 406, such as a barometric pressure sensor, humidity sensor, temperature sensor, and so on. Additional sensor data, such as light detection and ranging (LIDAR) data, can be collected from the sensor 404.

The first PCR 302(1) can also exchange pathside data with one or more traffic control devices 312. The traffic control device(s) 312 can provide traffic data, such as an indication it is changing or about to change a traffic control state (e.g., from a green light to a red light), which may facilitate advance warning being given by the first PCR 302(1) to a driver of the client device 304(1) and/or automated control of the client device 304(1) within the coverage range of the first PCR 302(1) or even to vehicles entering the coverage range by means of transferring the data to the neighboring second PCR 302(2). In some cases, the first PCR 302(1) can generate traffic data (such as density, speed, and so on of client devices 304(1)-304(M)) based on client data received from the client devices 304(1)-304(M). Pathside data can also be routed to the traffic control device(s) 312 through the first PCR 302(1), such as to facilitate traffic control decisions based on the number of client devices 304(1)-304(M) traveling within an area. For example, in an intersection between a busy street and a quiet side street, the PCRs 302(1)-302(N) may improve mobility, save energy and reduce pollution by causing the traffic light to change only when the PCR 302(1)-302(N) detects a vehicle in the quiet side street approaching the intersection. This way, the traffic on the busy street does not unnecessarily stop, which could waste energy.

In an exemplary aspect described above with respect to FIG. 3, the first PCR 302(1) receives client data, sensor data, traffic data, and/or other information, processes the received data, and generates pathside data to be distributed to client devices 304(1)-304(M) within its communication coverage area 308(1). The pathside data may include relevant portions of the client data, sensor data, traffic data, and/or other information for one or more of the client devices 304(1)-304(M), such as a mapping of all client devices 304(1)-304(M) and/or other nearby objects, alerts of potential or actual collisions, weather conditions, vehicle operating status, positional information of client devices 304(1)-304(M), speed information of client devices 304(1)-304(M), and so on. For example, the first PCR 302(1) can receive first client data (which includes a first position of the first client device 304(1)), second client data (which includes a second position of the second client device 304(2)), and so on, and include a map in the pathside data which is based on the first client data, the second client data, and so on. In some examples, a relevant portion of client data, sensor data, and/or other information can be based at least in part on relative positions of a first client device 304(1) and a second client device 304(2).

The first PCR 302(1) is coupled to the PCR network 300, through which it may exchange pathside data with the other PCRs 302(2)-302(N) and/or the central unit 314. For example, the first PCR 302(1) can receive client data from the client device 304(1) and/or sensor data from the camera 402, environmental sensor 406, and/or other sensor 404. The first PCR 302(1) can also receive data from the PCR network 300 from the central unit 314. A processing circuit (described further below with reference to FIG. 5A) of the first PCR 302(1) can then process the collected data to cause pathside data to be generated and broadcast to all client devices 304(1)-304(M) within the first communication coverage area 308(1) and another set of pathside data to be generated and transmitted to the PCR network 300 (e.g., to the central unit 314 and/or another PCR 302(2)-302(N)). The pathside data transmitted to the PCR network 300 can include, for example, relevant portions of the client data and sensor data, positional information of client devices 304(1)-304(M), a mapping of client devices 304(1)-304(M), and so on. Similarly, the first PCR 302(1) can receive network data from the PCR network 300, process the network data with a processing circuit (e.g., to determine a relevant portion of the network data for client devices 304(1)-304(M), extract positional information of client devices 304(1)-304(M) or other objects from other regions of the vehicle path, generate a mapping, extract alert information, and so on) and transmit at least a portion of the network data to client devices 304(1)-304(M). In an exemplary aspect, the portion of the network data may be a relevant port of the network data for the client devices 304(1)-304(M) which is transmitted within the first communication coverage area 308(1) through the first communication interface circuit 306(1).

In some cases, the PCR 302(1) may interface and exchange pathside data with the central unit 314, which in turn distributes pathside data between the PCRs 302(1)-302(N). In such examples, a pathside control module 412 can include a processor and/or other circuitry to control data exchanges through the PCR network 300, such as by determining whether pathside data obtained by a second PCR 302(1) or any breaking news in the area (such as a police chase) are relevant to the first PCR 302(1) and/or client devices 304(1)-304(M) and/or traffic control devices 312 connected to the first PCR 302(1), as will be described in examples below. Relevant pathside data can be any pathside data which would facilitate improving vehicle guidance, automated vehicle control, traffic control, pedestrian alerts, emergency vehicle response, and so on. Once pathside data is determined to be relevant to the first PCR 302(1), the pathside control module 412 causes the pathside data to be routed to the first PCR 302(1) to be forwarded to the client device(s) 304(1)-304(M), traffic control device(s) 312, and/or other DSRC or C-V2X devices to which the pathside data is relevant. In some cases, the central unit 314 and/or the pathside control module 412 can be deployed within one or more remote servers, such as a cloud server. In some cases, the pathside control module 412 may be used as a live database that the processing circuit of the first PCR 302(1) may regularly use in processing the pathside data, determining the data to be transmitted to the PCR network 300 and the data to be broadcast within the first communication coverage area 308(1).

In some cases, additional wireless communications services may also be distributed to the client devices 304(1)-304(M) through the PCRs 302(1)-302(N), such as cellular data and/or internet data. In this regard, the PCRs 302(1)-302(N) can be communicatively coupled to a base transceiver station (BTS) 414 (e.g., through the central unit 314, another proxy, or directly). In an exemplary aspect, the central unit 314 receives downlink communications signals from the BTS 414 to be distributed to the PCRs 302(1)-302(N). The downlink communications signals can include cellular data and/or internet data. The communication interface circuits 306(1)-306(N) of the PCRs 302(1)-302(N) can in turn be configured to distribute downlink communications signals from the BTS to the client devices 304(1)-304(M) and receive uplink communications signals from the client devices 304(1)-304(M) via wireless signals 310(1)-310(P) (see FIG. 3). The central unit 314 receives the uplink communications signals from the PCRs 302(1)-302(N) to be forwarded to the BTS 414. The BTS 414 and/or central unit 314 can interface with a packet data network gateway with connectivity to the internet, a cellular network, (e.g., an Evolved UMTS Terrestrial Radio Access Network (E-UTRAN)), and similar communications networks. The uplink communications signals may include pathside data, client data, and other information, such as vehicle location data or image and/or video data uploaded from a client device 304(1)-304(M).

Some embodiments of the PCR network 300 distribute pathside data between the PCRs 302(1)-302(N) and the central unit 314, and/or the BTS 414 over optical communications media. In an exemplary embodiment, each PCR 302(1)-302(N) includes an electrical-to-optical (E-O) converter 416(1)-416(N) configured to convert a respective electrical communications signal of the PCRs' 302(1)-302(N) pathside data into a respective optical communications signal. The respective optical communications signals are transported to the central unit 314 by an optical fiber communications link coupled between each PCR 302(1)-302(N) and the central unit 314. Each PCR 302(1)-302(N) also includes an optical-to-electrical (O-E) converter 418(1)-418(N) configured to convert received optical communications signal(s) for the pathside data back into the respective electrical communications signal to interface with a communication interface circuit 306(1)-306(N) of the PCR 302(1)-302(N). In some examples, the central unit 314 can also include one or more O-E converters 420(1)-420(K) for converting the pathside data and/or communications signals from optical to electrical before routing the pathside data and/or communications signals, and converting the pathside data and/or communications signals back to optical with one or more E-O converters 422(1)-422(K). It should be understood that each optical fiber communications link may have a separate uplink and downlink medium, or may be a common optical fiber communications link. For example, wave division multiplexing (WDM) may be employed to carry the downlink optical communications signals and the uplink optical communications signals on the same optical fiber communications link.

With continuing reference to FIGS. 3 and 4, relevant pathside information can be shared between PCRs 302(1)-302(N) through the PCR network 300. In some cases, the PCRs 302(1)-302(N) can determine relevant portions of pathside information (e.g., using a processing circuit), and in other cases the pathside control module 412 is configured to control the central unit 314 to route relevant pathside data between PCRs 302(1)-302(N). In an exemplary aspect, each client device 304(1)-304(M) along a vehicle path is in communication with at least one nearby PCR 302(1)-302(N), and may be transmitting client data to the PCR(s) 302(1)-302(N) periodically, intermittently, or otherwise via wireless signals 310(1)-310(P). The client data can include the client device's 304(1)-304(M) position, orientation, speed, acceleration, direction of travel, size, and/or an operating status of the client device 304(1)-304(M). In some cases, all or a portion of this client data can be determined (e.g., by each PCR 302(1)-302(N) or the pathside control module 412) to be relevant to all client devices 304(1)-304(M) within an area (e.g., within a given radius, within adjacent communication coverage areas 308(1)-308(N), and so on). For example, each of the client devices 304(1)-304(M) illustrated in FIG. 4 can receive some or all of the client data of each of the other client devices 304(1)-304(M).

In other aspects, pathside data can be determined (e.g., by the PCRs 302(1)-302(N) or the pathside control module 412) to be relevant to other client devices 304(1)-304(M), traffic control devices 312, and so on based on relative location, direction, and/or action. For example, a second client device 304(2) (e.g., a second vehicle) that is going to change lanes can transmit or update its client data to a nearby PCR (e.g., the first PCR 302(1)) through wireless signals 310(2) to include a virtual turn signal. The first PCR 302(1) can broadcast the virtual turn signal and/or additional client data of the second client device 304(2) to each client device 304(1)-304(M) in the first communication coverage area 308(1). The pathside control module 412 and/or the first PCR 302(1) can also determine that the virtual turn signal and/or additional client data of the second client device 304(2), is relevant to the second PCR 302(2) and/or a fifth client device 304(5) connected to the second PCR 302(2), and route the client data from the first PCR 302(1) to the second PCR 302(2) accordingly.

In a similar manner, the PCRs 302(1)-302(N) and/or the pathside control module 412 can determine that client data from the fifth client device 304(5) is relevant to the traffic control device 312. The client data from the fifth client device 304(5) can be routed from the second PCR 302(2) to the traffic control device 312. Information from the traffic control device 312, such as a current and/or upcoming traffic signal, can be routed to the client devices 304(1)-304(M) through the first PCR 302(1) and the second PCR 302(2) as well. In other cases, where the fourth client device 304(4) experiences a mechanical failure, the PCR network 300 may alert nearby client devices 304(1)-304(M) of a safety risk or request assistance from emergency or assistance vehicles through the PCRs 302(2)-302(N) and/or the central unit 314.

Figure 2A:
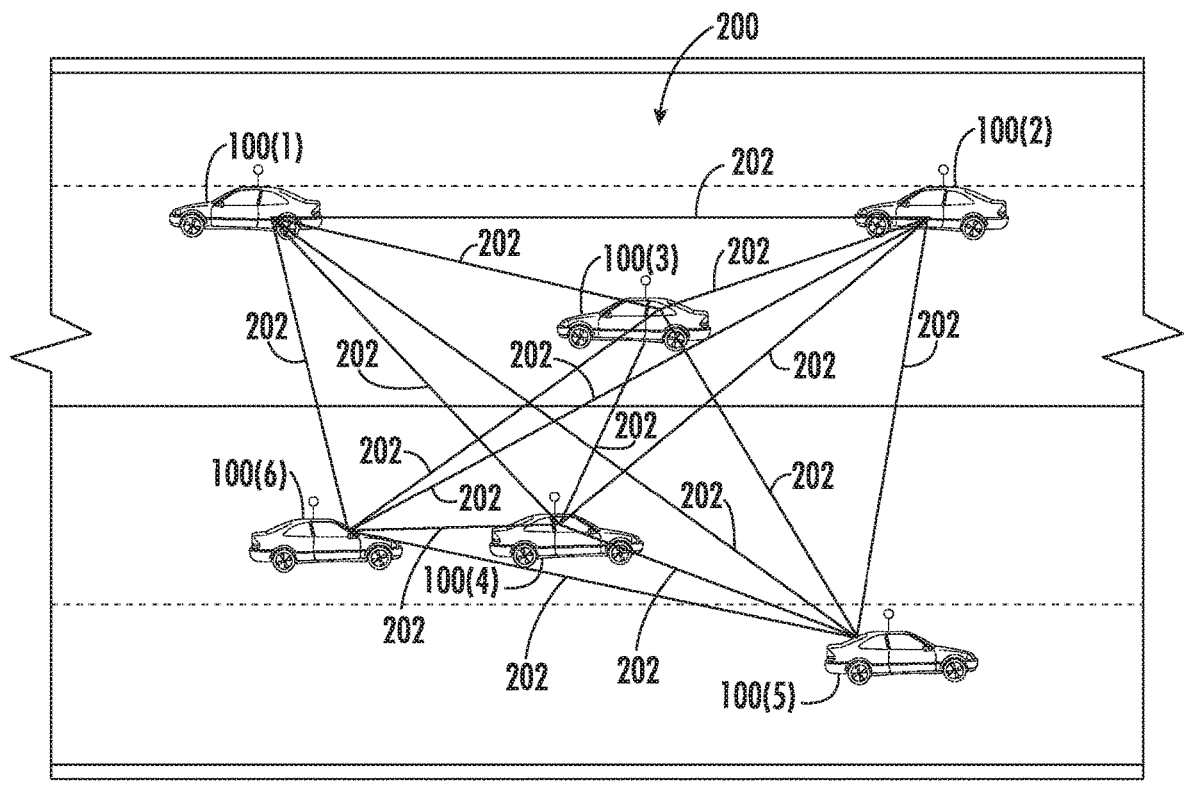
FIG. 2A is a schematic diagram of radio-bearing vehicles, illustrating an example of the number of connections required to form a traditional VANET.
Figure 2B:
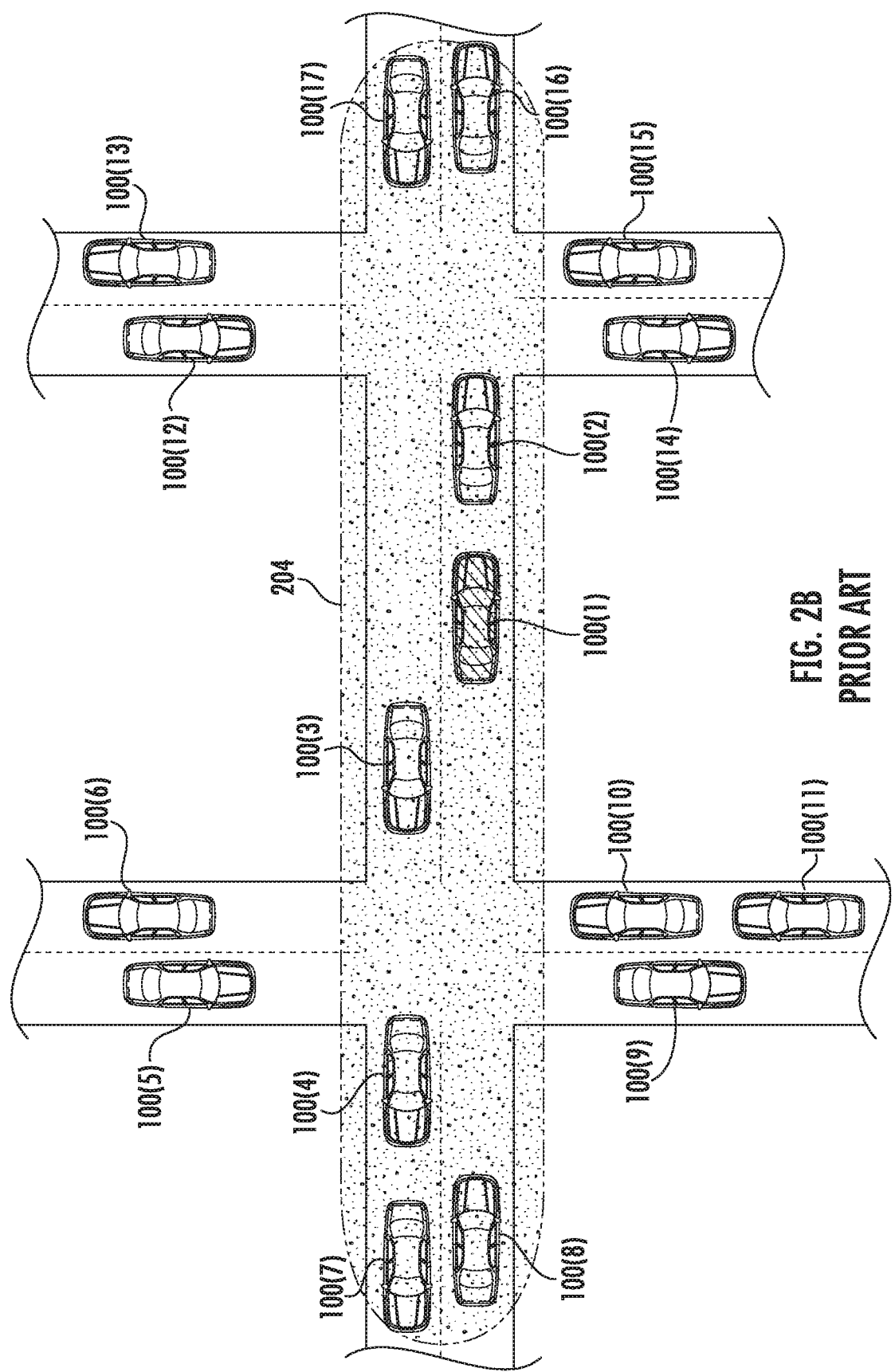
FIG. 2B is another schematic diagram of radio-bearing vehicles, illustrating the limitations of effective communication ranges under the conventional VANETs of FIG. 1.

As these examples demonstrate, the PCR network 300 can increase the quality of service of client device (e.g., vehicle) communications through DSRC and/or C-V2X communications over traditional VANETs. The PCR network 300 provides a stationary backbone for DSRC and/or C-V2X communications, enabling a client device 304(1)-304(M) to communicate with one or more PCRs 302(1)-302(N) (which in some cases have a larger communication coverage area 308(1)-308(N)), rather than needing to communicate with each client device 304(1)-304(M) and other devices separately (which may have smaller coverage areas or whose signals may be obstructed by buildings and other conditions). This stationary backbone structure can significantly reduce communication drop offs as well. In conventional VANETs, a vehicle often cannot receive data around a street corner, as illustrated in FIG. 2B. However, with the help of the PCR network 300, the drivers can receive information around corners at street intersections, such as safety or traffic information. Each PCR 302(1)-302(N) can also improve network security by having more robust verification procedures and security protections, while protecting the privacy of client devices 304(1)-304(M) and their users through masking identifying information exchanged with other client devices 304(1)-304(M). The PCR 302 network may be under control of trusted agencies, such as local government agencies and their contractors. Just as traffic control signals and signs are trusted by the public, the pathside information provided by the PCR 302 can be trustworthy to all client devices 304(1)-304(M), resulting in significant reduction in traffic accidents and vehicle related fatalities.

The examples of FIGS. 3 and 4 are described with respect to a central unit 314 distributing pathside data between the PCRs 302(1)-302(N). It should be understood that the distribution of pathside data can be accomplished in other ways, including in a decentralized manner. For example, in some embodiments, the central unit 314 can be omitted and the PCRs 302(1)-302(N) can communicate directly with each other (e.g., through optical links, data cable links, or over-the-air via RF, mmWave, laser, or optical communications) to distribute pathside data. The PCRs 302(1)-302(N) can also receive pathside data and other data from remote servers, such as telecommunications operator servers, traffic control servers, and so on. In another example, the central unit 314 and/or its functions can be deployed within one or more remote servers, such as a cloud server. In yet another example, in a remote area having only three or four PCRs 302(1)-302(N), one PCR 302(1) may act as the central unit 314.

Figure 5A:
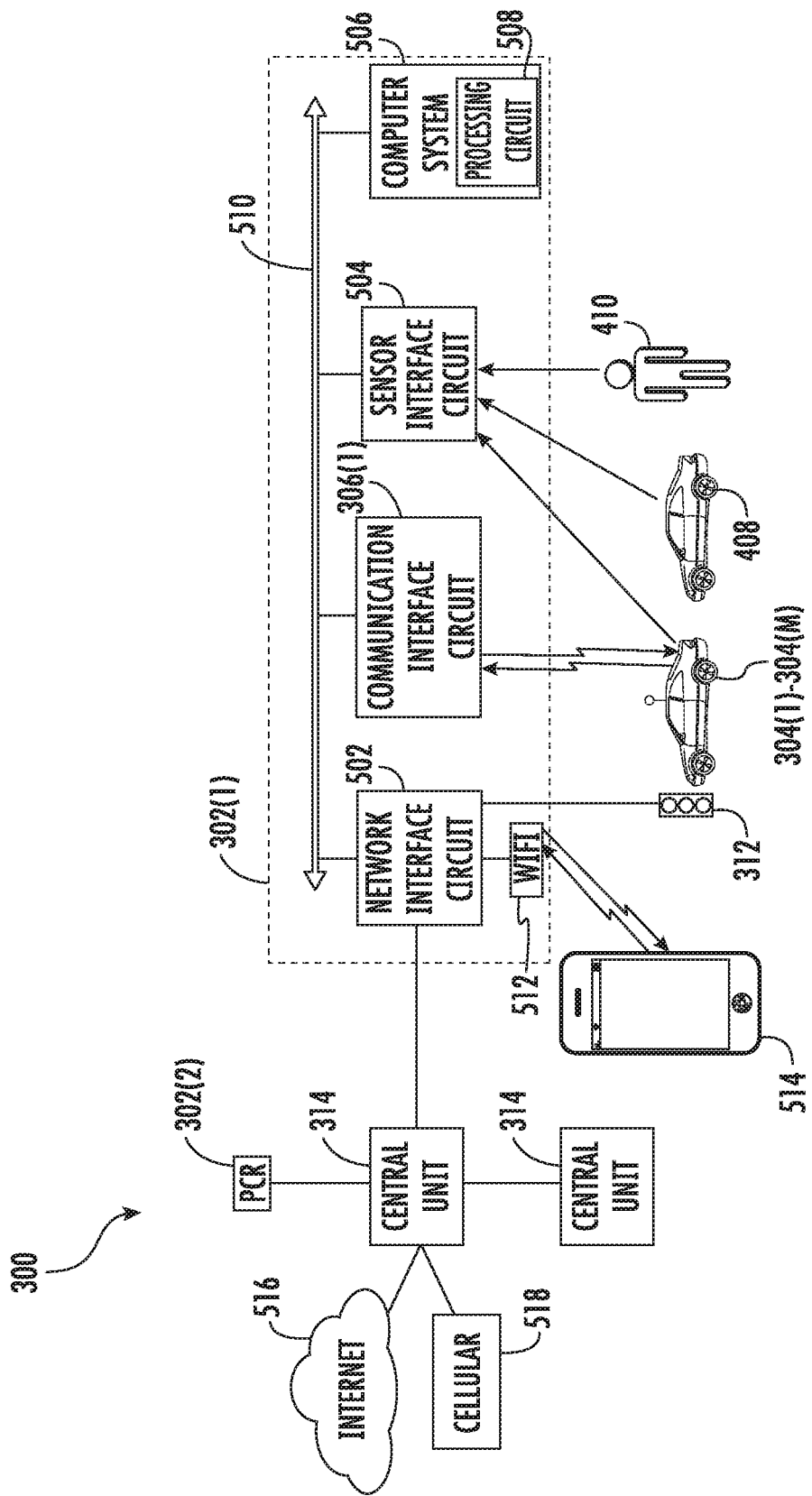
FIG. 5A is a schematic diagram of an exemplary PCR which communicates with client devices using radio frequency (RF) or other over-the-air signals and forms part of the PCR network of FIG. 3.

In an exemplary aspect, each of the PCRs 302(1)-302(N) includes and/or is coupled to multiple components, as illustrated in FIGS. 5A-5E. FIG. 5A is a schematic diagram of an exemplary PCR 302(1) which communicates with client devices 304(1)-304(M) using RF or other over-the-air signals (e.g., according to DSRC and/or C-V2X protocol), and forms part of the PCR network 300 of FIG. 3. The PCR 302(1) is comprised of four (4) main components. A network interface circuit 502 is provided to couple the PCR 302(1) to the PCR network 300, including other PCRs 302(2)-302(N) and the central unit 314. A communication interface circuit 306(1) is capable of communicating with client devices 304(1)-304(M) over DSRC signals using the IEEE 802.11p WAVE protocol on the 5.85 GHz-5.925 GHz ITS frequency band and/or C-V2X signals on cellular (e.g., 2G, 3G, LTE, 4G, 5G, NR) or other frequency bands. A sensor interface circuit 504 couples to one or more sensors to provide additional pathside information. The PCR 302(1) also includes a computer system 506 which incorporates a processing circuit 508 and provides processing capability to support features described herein. These main components (the network interface circuit 502, the communication interface circuit 306(1), the sensor interface circuit 504, and the computer system 506) may communicate with each other via a data bus 510.

The network interface circuit 502 can be an appropriate hardware interface which is configured to couple to the PCR network 300 and can communicatively link the PCR 302(1) with other components of the PCR network 300, including but not limited to the central unit 314, the internet 516, a cellular network 518, and/or other PCRs 302(2). Generally, the network interface circuit 502 is configured to receive downlink communications (including pathside data, internet data, and/or cellular data) from other components of the PCR network 300 (e.g., through the central unit 314) to be transmitted by the communication interface circuit 306(1) to nearby client devices 304(1)-304(M). The network interface circuit 502 also transmits uplink communications (e.g., pathside data, internet data, and/or cellular data) received through the communication interface circuit 306(1), the sensor interface circuit 504, and/or the computer system 506 to other components of the PCR network 300 (e.g., through the central unit 314). In examples disclosed herein, the network interface circuit 502 receives pathside data from the central unit 314 which has been determined to be relevant to the PCR 302(1), a region of the vehicle path associated with the PCR 302(1) (e.g., the communication coverage area 308(1) in FIG. 3), and/or a client device in communication with the PCR 302(1). The network interface circuit 502, in return, passes pathside data received through the communication interface circuit 306(1), the sensor interface circuit 504, and/or the computer system 506 to the central unit 314. An example of the network interface circuit 502 is the Gigabit Ethernet Module of a Corning® ONE™ remote antenna unit (RAU). In some examples, the PCR 302(1) can exchange traffic or other data with traffic control devices 312 through the network interface circuit 502.

The central unit 314 can distribute pathside data (and/or communications data, such as internet data and/or cellular data) between the PCR 302(1) and at least one other PCR 302(2). In some examples, the central unit 314 also communicates with other central units 314. An example of the central unit 314 can include the Corning® ONE™ headend unit (HEU). In an exemplary aspect, the PCR 302(1) also incorporates WiFi hardware 512 for communicating with user devices 514 (which may also be considered client devices 304(1)-304(M)) over the IEEE 802.11 WiFi standard. The network interface circuit 502 can include a local area network (LAN) or similar interface to provide internet and other communications data to the WiFi hardware 512.

As illustrated in FIG. 5A, in some cases uplink and downlink communications, which can include pathside data, cellular data, and internet data, are exchanged with the internet 516, the cellular network 518, other PCRs 302(2), and so on through the central unit 314. In other cases, the central unit 314 may be omitted, and the network interface circuit 502 may enable the PCR 302(1) to send and receive such data to the internet 516 (e.g., through an Ethernet link, a passive optical local area network (POL) link, a WiFi link, and/or other communications links), to the cellular network 518 (e.g., through the BTS 414 of FIG. 4), and to other components of the PCR network 300 (e.g., other PCRs 302(2)). In a further exemplary embodiment, the network interface circuit 502 can communicatively couple the PCR 302(1) (e.g., through the central unit 314, directly, or through another network such as the internet 516) with one or more remote servers, such as telecommunications operator servers, traffic control servers, servers which include some or all functions of the central unit 314, and so on, to send and receive pathside and other data to be distributed among the client devices 304(1)-304(M).

The communication interface circuit 306(1) exchanges pathside data (and/or cellular data and/or internet data) with client devices 304(1)-304(M) within its coverage area (e.g., the communication coverage area 308(1) in FIG. 3). Accordingly, the communication interface circuit 306(1) can incorporate communication circuitry capable of operating under the DSRC/WAVE protocol and/or the C-V2X protocol. The communication interface circuit 306(1) may include an RF receiver circuit and an RF transmitter circuit, which form an RF coverage area (e.g., communication coverage area 308(1) in FIG. 3) covering a region of a vehicle path. In an exemplary aspect, the RF transmitter circuit can be configured to broadcast DSRC signals over ITS frequency channels, and the RF receiver circuit can be configured to receive client data over ITS frequency channels. In another exemplary aspect, the RF transmitter circuit and the RF receiver circuit can include cellular radio circuitry, and the RF transmitter circuit can transmit C-V2X signals (e.g., via broadcast or separate communication channels) over cellular RF frequency channels. In this regard, the communication interface circuit 306(1) can operate over RF frequency bands (e.g., the 5.85 GHz-5.925 GHz ITS frequency band, 2G frequency bands, 3G frequency bands, LTE frequency bands, CBRS frequency bands, and so on), over mmWave frequencies (e.g., 60-80 GHz), over optical frequencies (e.g., 230 THz), and so on. In some examples, the communication interface circuit 306(1) includes a global positioning system (GPS) device or a GNSS device, and in other examples a GPS device may be included in other components of the PCR 302(1), such as the sensor interface circuit 504 or the computer system 506. Examples of the communication interface circuit 306(1) include the LocoMate™ RoadSide Unit (RSU) made by Arada Systems and the Intelligent Roadside Unit made by NXP Semiconductors, although the functions of the communication interface circuit 306(1) can be integrated within other circuitry.

The sensor interface circuit 504 can couple to or include some or all of the camera 402, sensors 404, and environmental sensors 406 depicted in FIG. 4. Some or all of the sensors may be incorporated in the PCR 302(1), or the sensors may be in one or more separate devices. The sensor interface circuit 504 can also couple to or include a detector, receiver, transmitter, and/or imaging device for acoustic waves and/or electromagnetic waves. The sensor interface circuit 504 can transmit, receive, and/or otherwise detect electromagnetic waves (e.g., using an RF identification (RFID) reader) at RF frequencies, THz frequencies, optical frequencies, x-ray frequencies, infrared frequencies, or a combination of these frequencies. The sensor interface circuit 504 can couple to or include humidity sensors, seismic sensors, and/or other environmental sensors. The sensor interface circuit 504 can also couple to or include a LIDAR system, a RADAR system, an ultrasonic system, and/or other device to determine relative locations and/or distances (e.g., relative to the sensor, PCR 302(1) or other objects) of nearby objects, such as client devices 304(1)-304(M). The sensor interface circuit 504 can couple to or include a laser communication system (e.g., to send and receive additional signals from client devices) and/or a microphone system (e.g., to determine the location of an approaching emergency vehicle). In some examples, the sensor interface circuit 504 can also connect to alert devices, such as a siren, a light source, a sign, and so on to provide messages for pedestrians or other vehicles which cannot receive PCR 302(1) communications over DSRC and/or C-V2X signals. In an exemplary aspect, sensor data obtained from the sensor interface circuit 504 is processed by the computer system 506 before being sent to the central unit 314 through the network interface circuit 502, though this is not required.

In this manner, the sensor data received via the sensor interface circuit 504 can include at least one of image data received from a camera (e.g., the camera 402 of FIG. 4) coupled to the sensor interface circuit 504, object location data received from at least one of a LIDAR, RADAR, or ultrasonic device coupled to the sensor interface circuit 504, traffic data received from a traffic monitoring device (e.g., the traffic control device 312 of FIGS. 3 and 4) coupled to the sensor interface circuit 504, or ambient conditions received from an environmental sensor (e.g., the environmental sensor 406 of FIG. 4) coupled to the sensor interface circuit 504. For example, a camera or other sensor coupled to the sensor interface circuit 504 can collect image data or other sensor data indicating locations of pedestrians 410, non-radio bearing vehicles 408, client devices 304(1)-304(M), and so on.

The computer system 506 integrates network data coming from the PCR network 300, the client data coming from the communication interface circuit 306(1), and the sensor data coming from the sensor interface circuit 504. Examples of network data from the PCR network 300 include signals from a neighboring PCR 302(2) (e.g., routed from the central unit 314 or directly from the neighboring PCR 302(2)) or a widespread security alert coming from the PCR network 300 (e.g., generated by the central unit 314). The computer system 506 provides onboard processing capability through the processing circuit 508 (such as described with reference to a computer system 1100 in FIG. 11 below). The processing circuit 508 can receive client data through the communication interface circuit 306(1) and/or sensor data from the sensor interface circuit 504, then process the client data and sensor data to generate pathside data. The processing circuit 508 can cause the pathside data to be distributed to client devices 304(1)-304(M) through the communication interface circuit 306(1) and/or transmitted to the PCR network 300 through the network interface circuit 502. For example, once sensor data from the sensor interface circuit 504, GPS data, and client data from the communication interface circuit 306(1) are received, the processing circuit 508 can generate predictive information on the location of client devices 304(1)-304(M), 408 at a future time, and can broadcast or in some cases selectively transmit an alert to a client device 304(1)-304(M) in case there is a chance of collision.

In another aspect, the computer system 506 (e.g., in conjunction with the central unit 314 and/or pathside control module 412 in FIG. 4) can carry out a minute by minute analysis of a disaster in a region of the vehicle path, such as a dam overflow or progress of a fire, and transmit appropriate information to the client devices 304(1)-304(M). In another aspect, the PCR 302(1) can couple to an infrastructure server (e.g., traffic control system, the central unit 314) or other device via the network interface circuit 502 to exchange additional information. For example, the processing circuit 508 of the computer system 506 can process information from the infrastructure server to be sent to client devices 304(1)-304(M) within the coverage area of the PCR 302(1), such as regional conditions including approach of emergency vehicles, information about an approaching train, information on roadway closures and construction, snow, ice, and flood conditions, state and national emergency messages, and so on. The computer system 506 can also process location data during peak traffic hours and/or collect client device 304(1)-304(M) identifications for toll or other fee collection and provide such information to a traffic management system (e.g., through the network interface circuit 502). The computer system 506 can deploy machine learning and/or artificial intelligence algorithms to better serve client devices 304(1)-304(M) and the PCR network 300, such as to predict traffic flow, map client devices 304(1)-304(M) and other objects, provide alerts, and so on. The computer system 506 can carry out all processing within the PCR 302(1). Alternately, the computer system 506 may coordinate the processing to be done in a remote computing system (e.g., the pathside control module 412 in FIG. 4), and act as an input/output unit within the PCR 302(1).

Figure 5B:
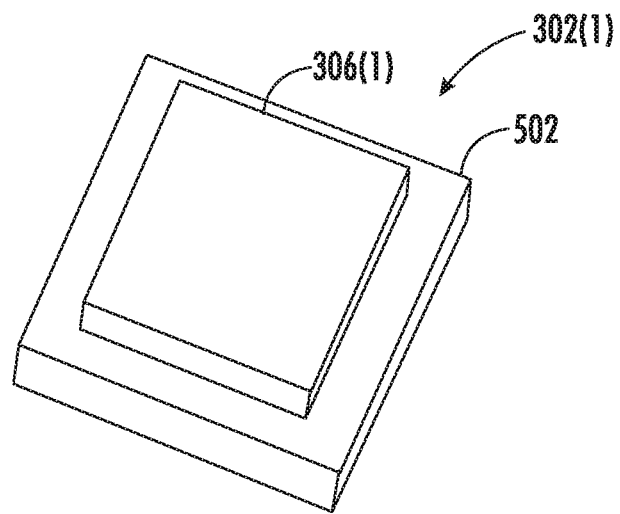
FIG. 5B is another schematic diagram of the exemplary PCR of FIG. 5A, illustrating components of the exemplary PCR.

FIG. 5B is another schematic diagram of the exemplary PCR 302(1) of FIG. 5A, illustrating components of the exemplary PCR 302(1). The main components of the PCR 302(1) can be modular and incorporated in one chassis, or the main components may be included in a physically separated or separable chassis. In some examples, one or more of the main components may be omitted or may be within another component of the PCR network 300, such as the central unit 314. For example, FIG. 5B illustrates the network interface circuit 502 physically integrated with the communication interface circuit 306(1). The sensor interface circuit 504 and/or the computer system 506 (of FIG. 5A) can also be incorporated with or otherwise interface with the network interface circuit 502 and the communication interface circuit 306(1).

Figure 5C:
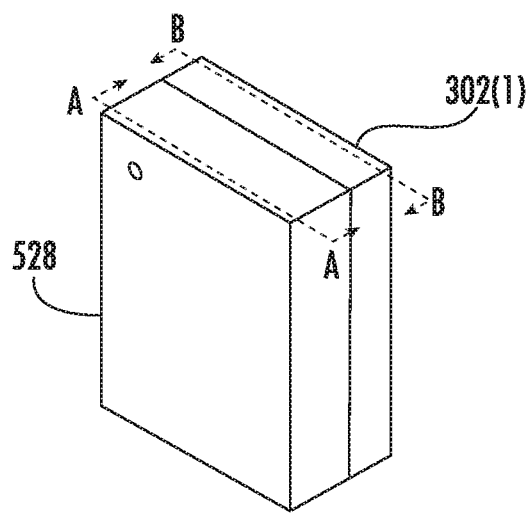
FIG. 5C is a schematic diagram of another example of the PCR of FIG. 5A, illustrating components of the exemplary PCR in an enclosure.
Figure 5D:
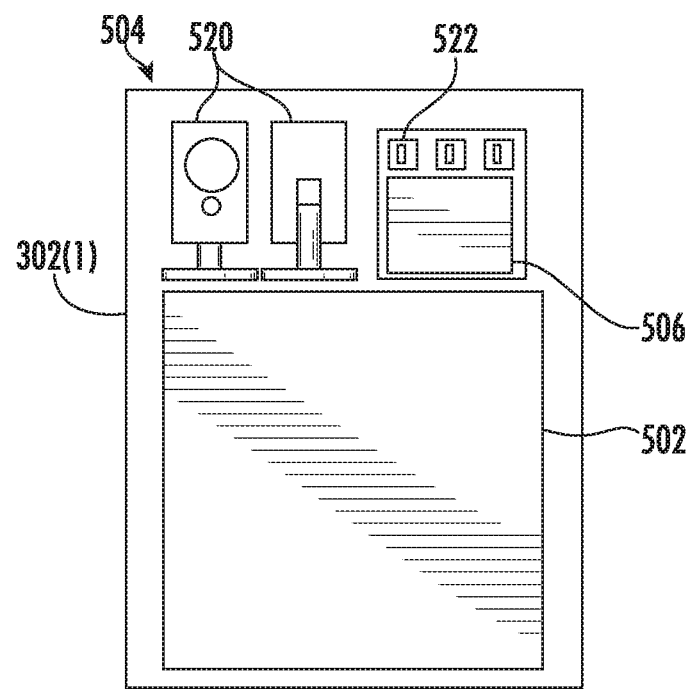
FIG. 5D is a cross-sectional view of the exemplary PCR taken along line A-A of FIG. 5C.
Figure 5E:
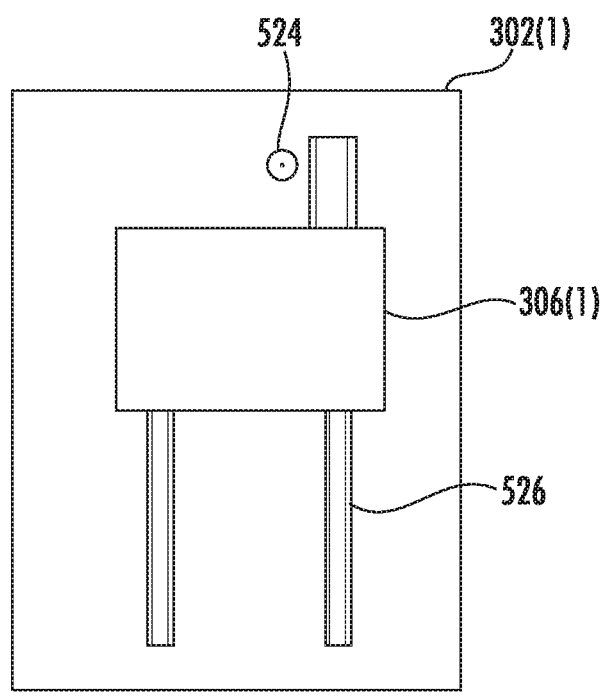
FIG. 5E is a cross-sectional view of the exemplary PCR taken along line B-B of FIG. 5C.

FIG. 5C is a schematic diagram of another example of the PCR 302(1) of FIG. 5A, illustrating components of the exemplary PCR 302(1) in an enclosure 528. FIG. 5D is a cross-sectional view of the exemplary PCR 302(1) taken along line A-A of FIG. 5C. FIG. 5E is a cross-sectional view of the exemplary PCR 302(1) taken along line B-B of FIG. 5C. In this regard, a first side of the PCR 302(1) (illustrated in FIG. 5D) can include the network interface circuit 502, the sensor interface circuit 504, and the computer system 506 as described above. The sensor interface circuit 504 can include or be coupled to sensors, such as one or more cameras 520. In some examples, one or more power converters 522 (e.g., DC-DC converters) can provide power to the components of the PCR 302(1), and may also provide power to external components, such as additional sensors or the traffic control devices 312 of FIGS. 3 and 4.

A second side of the PCR 302(1) (illustrated in FIG. 5E) can include a communication interface circuit 306(1). In some examples, the second side may accommodate sensors, such as through a camera opening 524. In addition, the communication interface circuit 306(1) may include or be coupled to one or more antennas 526 for transmitting and receiving DSRC signals and/or C-V2X signals, which may operate over the ITS frequency band, cellular frequency bands (e.g., 2G, 3G, LTE, 4G, 5G, NR), or other frequency bands.

Figure 6A:
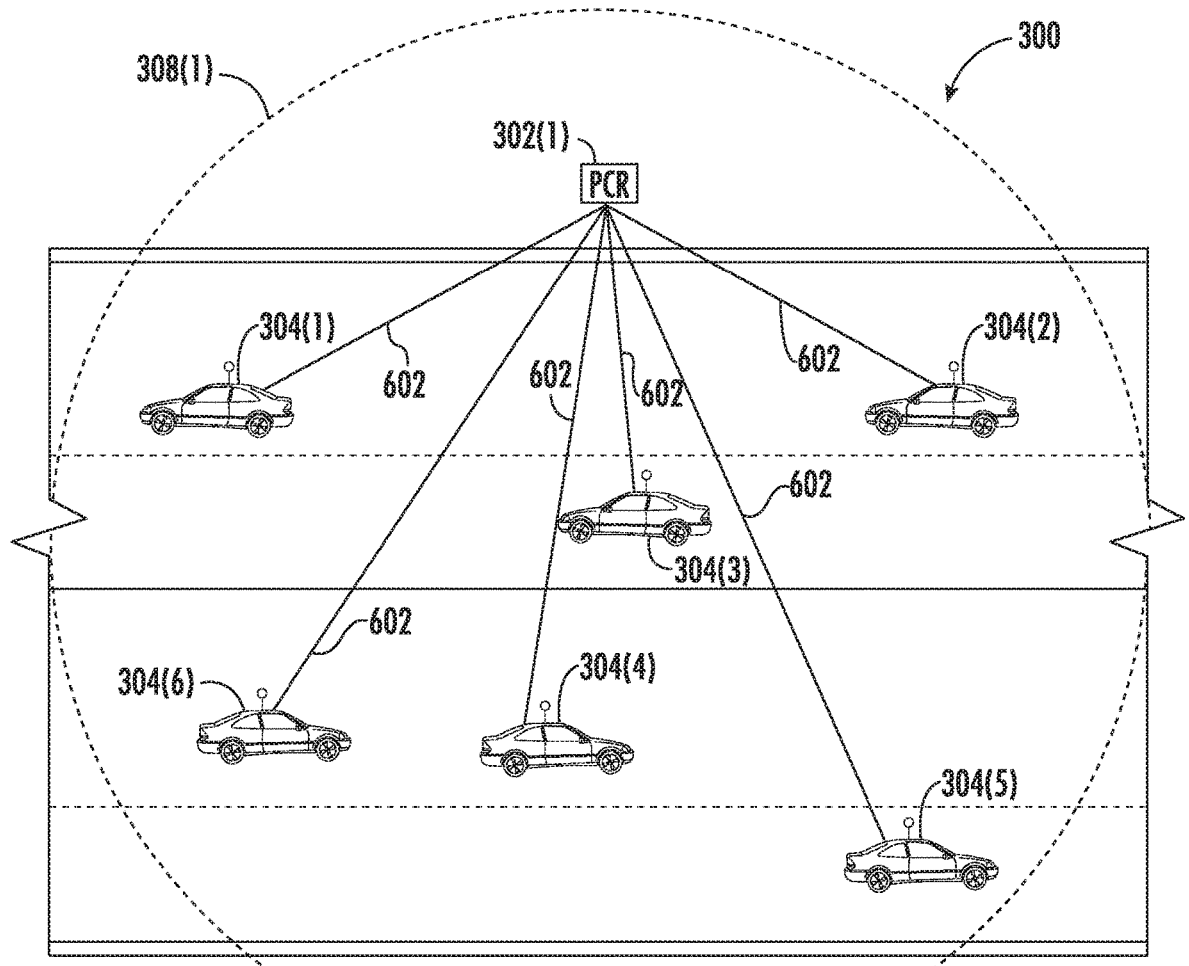
FIG. 6A is a schematic diagram of a portion of the PCR network of FIG. 3, illustrating an example of connections formed between a PCR and nearby client devices.
Figure 6B:
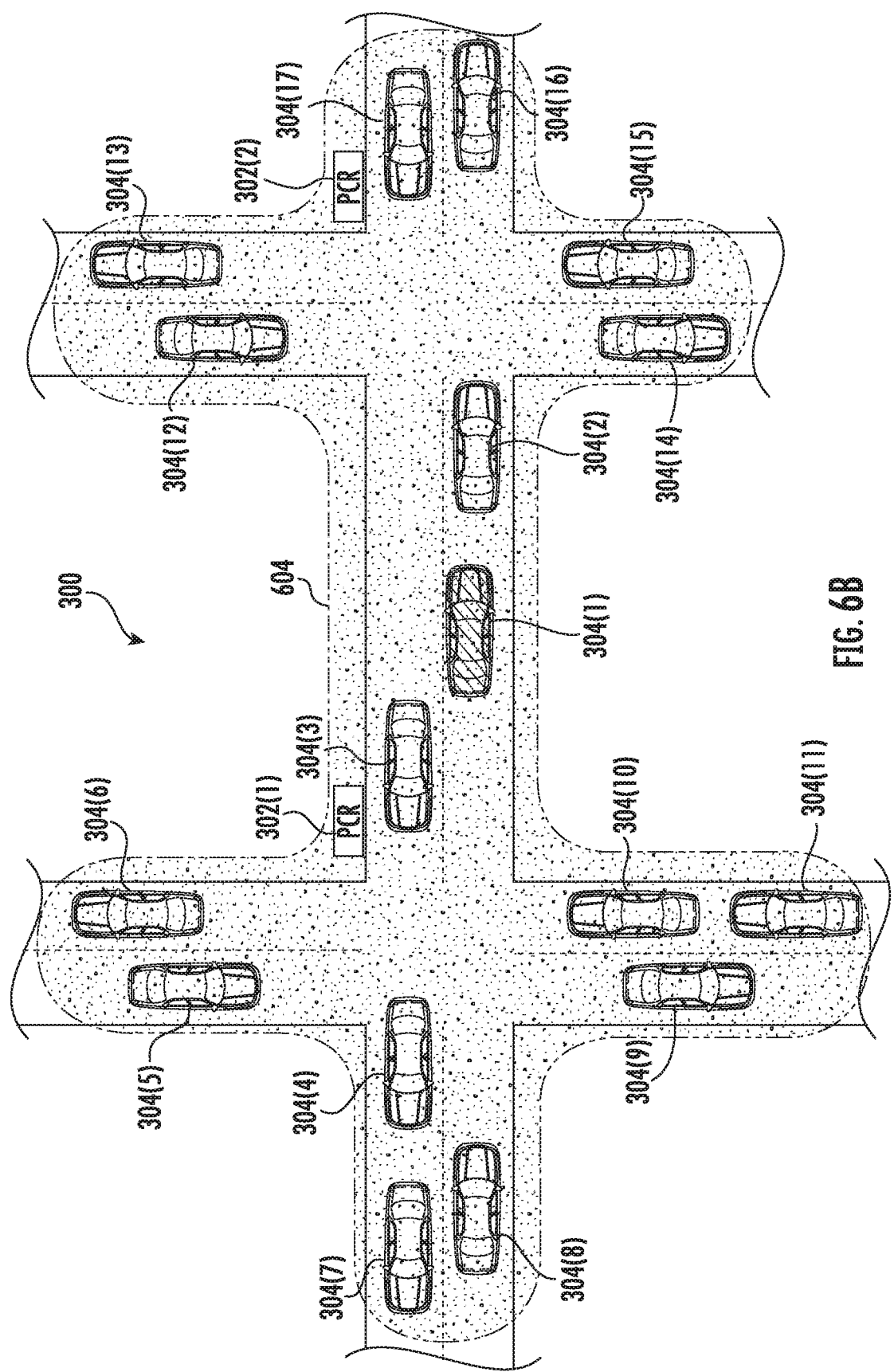
FIG. 6B is a schematic diagram of the PCR network of FIG. 3, illustrating improved communication ranges for the nearby client devices.

Turning to FIG. 6A-6B, a PCR 302(1) distributes pathside data among client devices 304(1)-304(6) by making a connection 602 with each DSRC and/or C-V2X-equipped client device 304(1)-304(6) in its communication coverage area 308(1). FIG. 6A is a schematic diagram of a portion of the PCR network 300 of FIG. 3, illustrating an example of connections 602 formed between the PCR 302(1) and nearby client devices 304(1)-304(6). In exemplary embodiments, the PCR 302(1) receives pathside data (e.g., from the client devices 304(1)-304(6), the sensor interface circuit 504 in FIG. 5A, or the central unit 314 of FIGS. 3-5A) and processes the pathside data. Processing the pathside data can include determining a relevant portion of the pathside data to be distributed—such as the position, speed, acceleration, direction of travel and/or orientation, and/or operating status of surrounding client devices 304(1)-304(6). The surrounding client devices 304(1)-304(6) may have temporary identification information which changes frequently so as not to give away permanent identification of the devices 304(1)-304(6) or their owners. The temporary identification information may be in the form of a temporary device identification so that it can be tracked while passing through a communication coverage area 308(1), the device identification changing with time frequently to prevent long term tracking. The processed data is then distributed to one or more of the client devices 304(1)-304(6) in the communication coverage area 308(1) (which may include a portion of the vehicle path). Due to the PCR 302(1) providing a backbone for V2X communications, a client device 304(1) establishes one connection 602 with the PCR 302(1) (and possibly one or more other nearby PCRs 302(1), such as during a communication handoff to a neighboring PCR 302(1)) without the need to establish separate connections with each other client device 304(2)-304(6). In this manner, pathside data can be exchanged among six client devices 304(1)-304(6) with only six (6) connections 602, rather than the fifteen (15) connections 202 needed in the traditional VANET 200 depicted in FIG. 2A. Moreover, a client device 304(1)-304(6) will need to trust only one PCR 302(1) instead of spending valuable time in verifying security of and preventing its exposure to many other nearby client devices 304(1)-304(6). Processing circuitry within the client device 304(1)-304(6) will most likely incur lower demand by needing to establish one V2X communication link as opposed to multiple links under conventional VANET approaches.

FIG. 6B is a schematic diagram of the PCR network 300 of FIG. 3, illustrating improved communication ranges for the nearby client devices 304(1)-304(17). As described with respect to FIG. 2B, under conventional approaches, DSRC communications transmitted over the ITS band of 5.9 GHz by the client devices 304(1)-304(17) have poor propagation through buildings and other large objects, limiting the effective range of those communications. However, the PCRs 302(1), 302(2) extend an effective communication range 604 of a first client device 304(1) to not only extend along its path of travel, but also around corners. Thus, through the first PCR 302(1), the first client device 304(1) is able to communicate with client devices 304(2)-304(17) within the larger effective communication range 604, including client devices 304(12)-304(15) around an upcoming intersection, decreasing a likelihood of a collision at the intersection. Currently a significant fraction of car accidents occur at intersections, and the PCR network 300 can significantly reduce such accidents.

Figure 7:
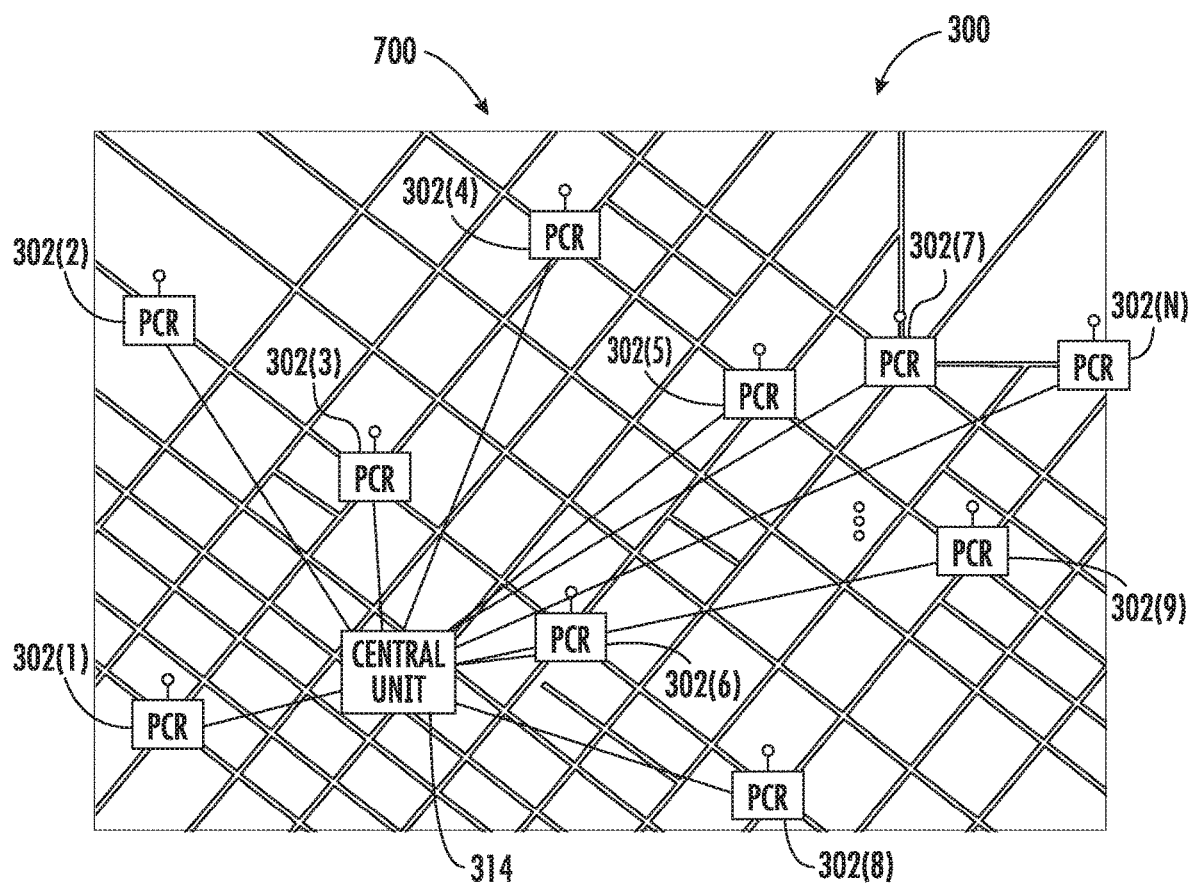
FIG. 7 is a schematic diagram of the PCR network of FIG. 3, illustrating exemplary PCRs connected with a central unit.

The PCR network 300 can be deployed across an array of vehicle paths 700, as illustrated in FIG. 7. FIG. 7 is a schematic diagram of the PCR network 300, illustrating exemplary PCRs 302(1)-302(N) connected with a central unit 314. As illustrated in FIG. 7, embodiments of the disclosure are not limited to small portions of a path, but a PCR network 300 can include PCRs 302(1)-302(N) placed around an array of vehicle paths 700, such as around all or a portion of a city, served by a common central unit 314. In some embodiments, more than one central unit 314 may serve a geographical region, and different central units 314 can coordinate routing data between the PCRs 302(1)-302(N) served by each central unit 314. The PCR network 300 illustrated in FIG. 7 can also be scalable, enabling additional PCRs 302(1)-302(N) and/or central units 314 to be added according to traffic needs and other system growth.

Figure 8A:
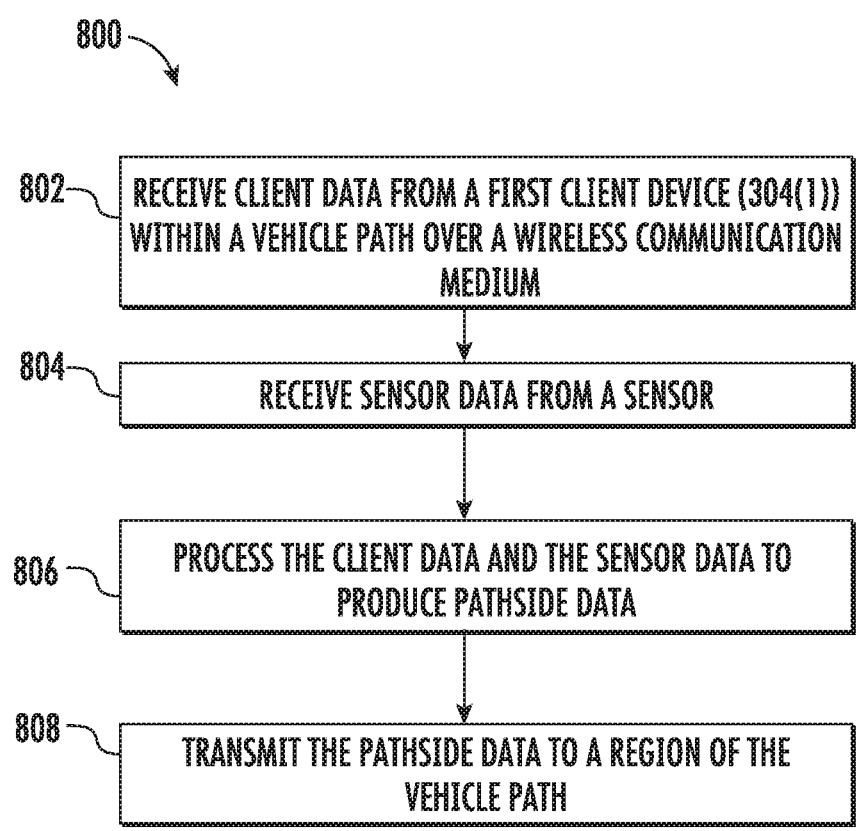
FIG. 8A is a flowchart illustrating an exemplary process of a PCR for communicating with clients in a path.

FIG. 8A is a flowchart illustrating an exemplary process 800 of a PCR 302(1) for communicating with clients within a path. The process 800 comprises receiving client data from a first client device 304(1) within the path over a wireless communication medium (block 802). The process 800 also comprises receiving sensor data from a sensor (block 804). The process 800 also comprises processing the client data and the sensor data to produce pathside data (block 806). The process 800 also comprises transmitting the pathside data to a region of the path (block 808).

Figure 8B:
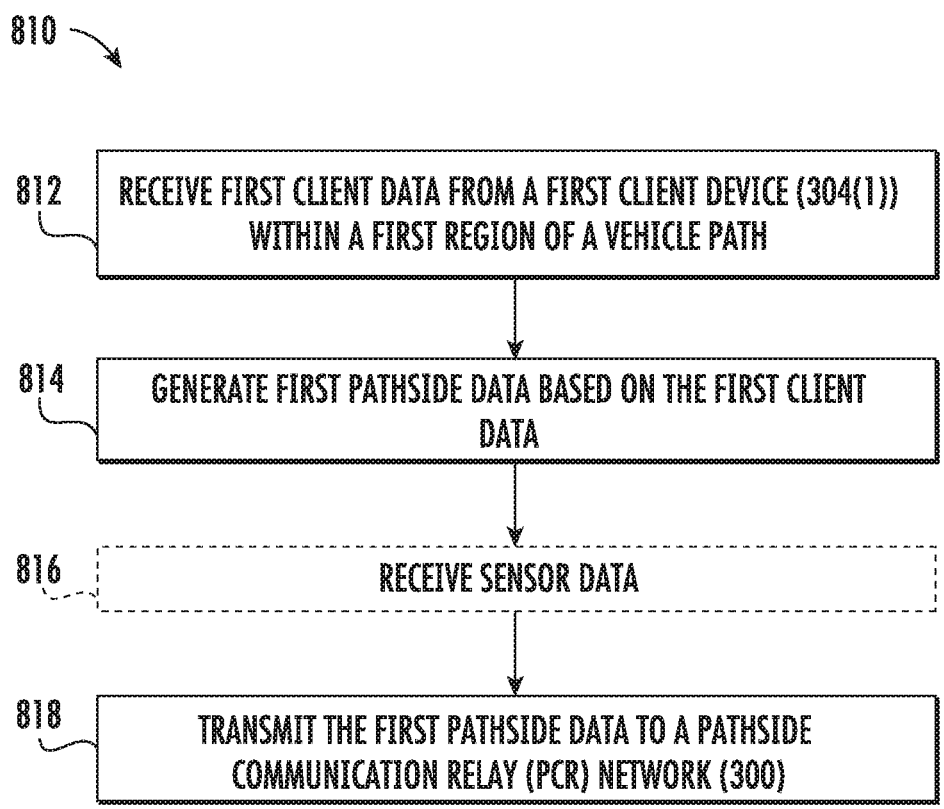
FIG. 8B is a flowchart illustrating an exemplary process of a PCR for distributing pathside data to a PCR network.

FIG. 8B is a flowchart illustrating an exemplary process 810 of a PCR 302(1) for distributing pathside data to a PCR network 300. The process 810 comprises receiving first client data from a first client device 304(1) within a first region of a vehicle path (block 812). The process 810 also comprises generating first pathside data based on the first client data (block 814). In some cases, the process also includes receiving sensor data from a sensor (block 816), which may also be included in the first pathside data of block 814. The process 810 also comprises transmitting the first pathside data to the PCR network 300 (block 818).

Figure 8C:
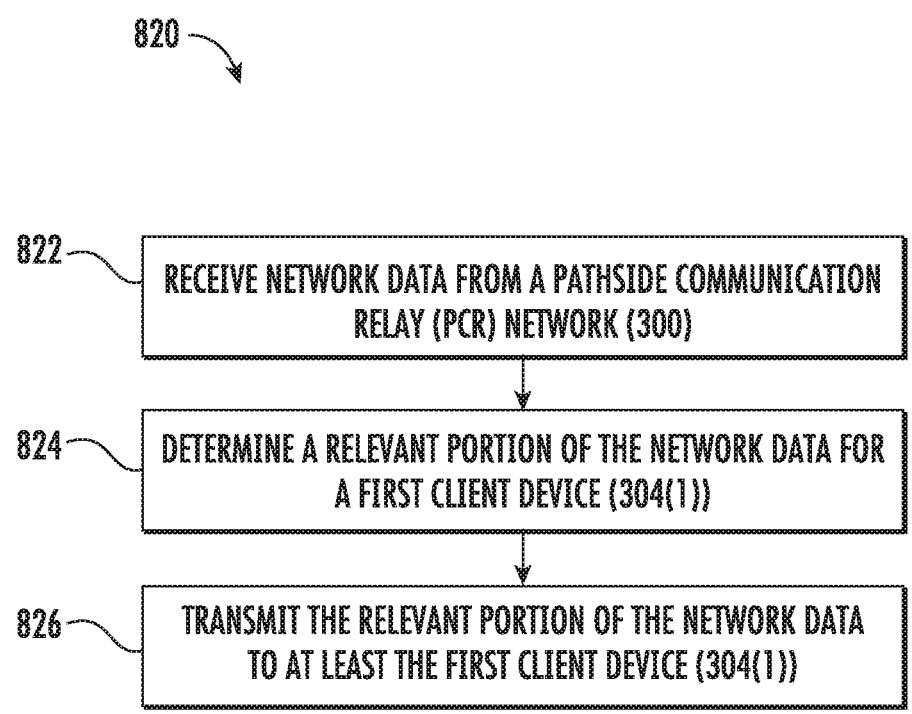
FIG. 8C is a flowchart illustrating an exemplary process of a PCR for distributing network data among client devices.

FIG. 8C is a flowchart illustrating an exemplary process 820 of a PCR 302(1) for distributing network data among client devices 304(1)-304(M). The process 820 comprises receiving network data from a PCR network 300 (block 822). The process 820 also comprises determining a relevant portion of the network data for a first client device 304(1) (block 824). The process 820 also comprises transmitting the relevant portion of the network data to at least the first client device 304(1) (block 826).

Figure 8D:
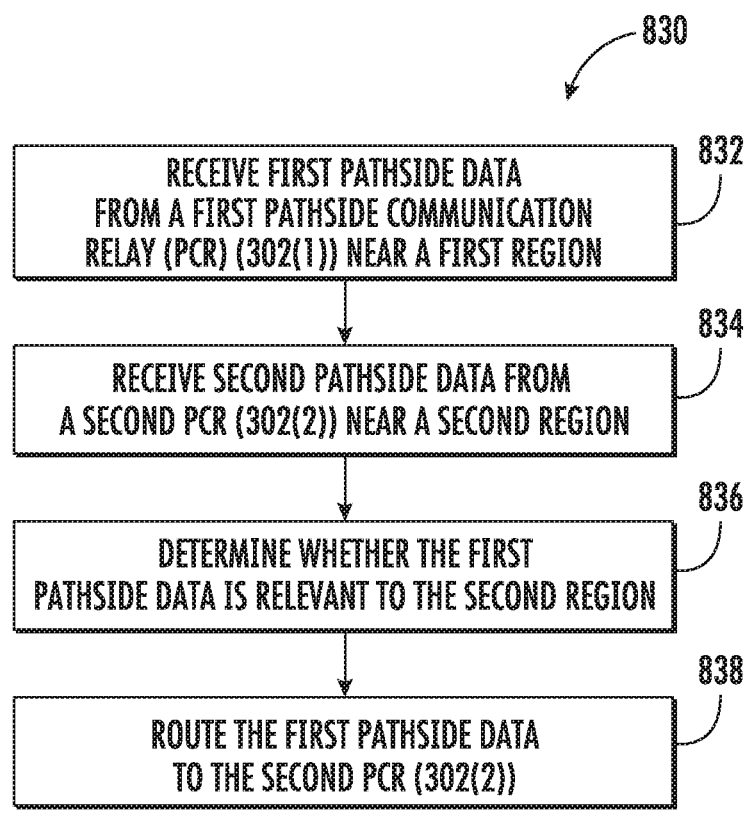
FIG. 8D is a flowchart illustrating an exemplary process of a central unit for receiving and distributing pathside data between a first PCR and a second PCR.

FIG. 8D is a flowchart illustrating an exemplary process 830 of a central unit 314 for receiving and distributing pathside data between a first PCR 302(1) and a second PCR 302(2). The process 830 comprises receiving first pathside data from a first PCR 302(1) adjacent a first region of a vehicle path (block 832). The process 830 also comprises receiving second pathside data from a second PCR 302(2) adjacent a second region of the vehicle path (block 834). The process 830 also comprises determining whether the first pathside data comprises information relevant to the second region of the vehicle path (block 836). The process 830 also comprises routing at least a portion of the first pathside data to the second PCR 302(2) when the first pathside data comprises the relevant information (block 838).

Figure 9:
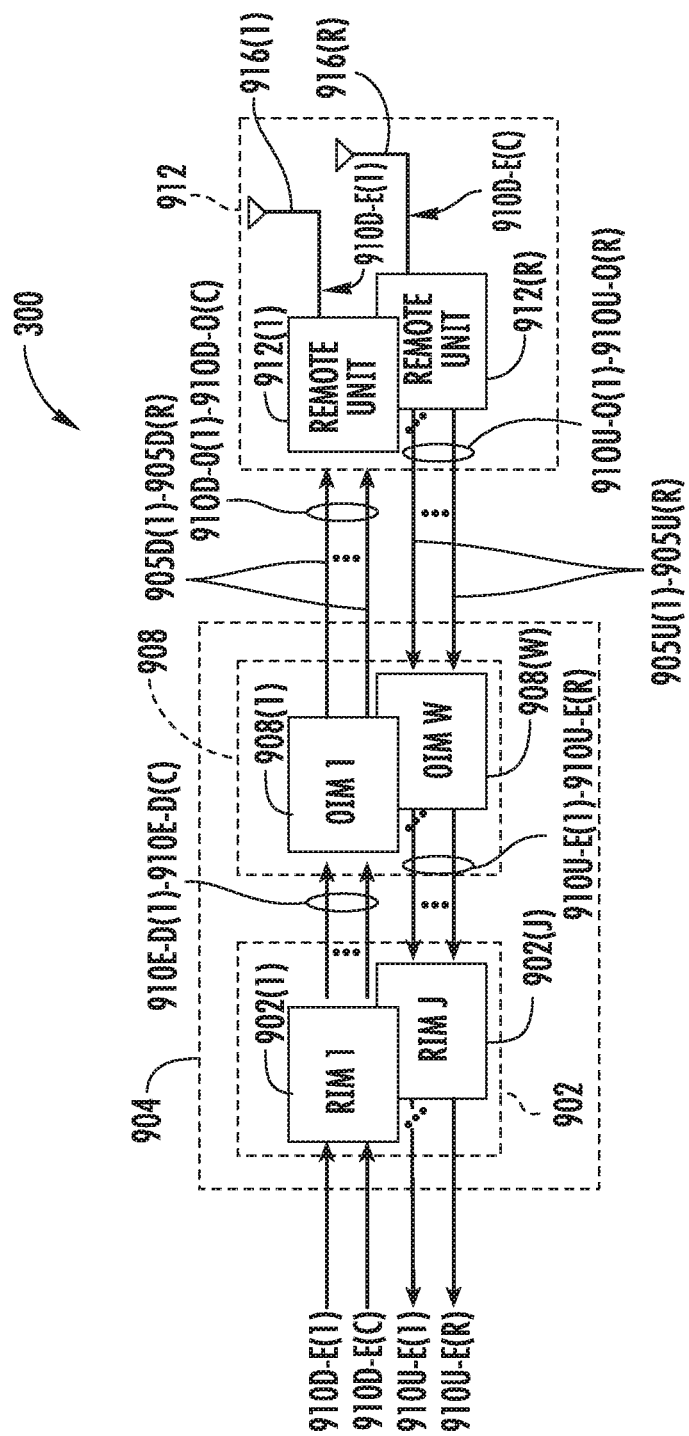
FIG. 9 is a schematic diagram of an exemplary optical-fiber based PCR network.

The PCRs 302(1)-302(N) of FIGS. 3-8D can be provided in a PCR network 300 that is optical-fiber based. In this regard, FIG. 9 is a schematic diagram of an exemplary PCR network 300 implemented in this example as an optical-fiber based PCR network 300. The optical-fiber based PCR network 300 is comprised of three (3) main components. One or more radio interfaces provided in the form of radio interface modules (RIMs) 902(1)-902(J) are provided in a central unit 904 (e.g., an HEU coupled to the central unit 314 of FIG. 3) to receive and process downlink RF communications signals 910D-E(1)-910D-E(C) prior to optical conversion into optical downlink communications signals. The RIMs 902(1)-902(J) provide both downlink and uplink interfaces for signal processing. The notations "1-J" and "1-C" indicate that any number of the referenced component, 1-J and 1-C, respectively, may be provided.

With continuing reference to FIG. 9, the central unit 904 is configured to accept the RIMs 902(1)-902(J) as modular components that can easily be installed and removed or replaced in the central unit 904. In one embodiment, the central unit 904 is configured to support up to twelve (12) RIMs 902(1)-902(12). Each RIM 902(1)-902(J) can be designed to support a particular type of radio source or range of radio sources (i.e., frequencies) to provide flexibility in configuring the central unit 904 and the optical-fiber based PCR network 300 to support the desired radio sources. For example, one RIM 902 may be configured to support the Personal Communication Services (PCS) radio band. Another RIM 902 may be configured to support the 700 MHz radio band. In this example, by inclusion of these RIMs 902, the central unit 904 could be configured to support and distribute communications signals, including those for the communications services and communications bands described above as examples.

The RIMs 902(1)-902(J) may be provided in the central unit 904 that support any frequencies desired, including but not limited to the ITS band of 5.9 GHz (5.85-5.925 GHz), licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink RF communications signals 910D-E(1)-910D-E(C) may be provided as downlink RF spectrum chunks to a plurality of optical interfaces provided in the form of optical interface modules (OIMs) 908(1)-908(W) in this embodiment to convert the unlicensed and/or licensed downlink RF communications signals 910D-E(1)-910D-E(C) into downlink optical communications signals 910D-O(1)-910D-O(C). The OIMs 908(1)-908(W) may be configured to provide one or more optical interface components (OICs) that contain optical-to-electrical (O-E) and electrical-to-optical (E-O) converters, as will be described in more detail below. The OIMs 908(1)-908(W) support the radio bands that can be provided by the RIMs 902(1)-902(J), including the examples previously described above.

The OIMs 908(1)-908(W) each include E-O converters to convert the downlink RF communications signals 910D-E(1)-910D-E(C) into the downlink optical communications signals 910D-O(1)-910D-O(C). The downlink optical communications signals 910D-O(1)-910D-O(C) are communicated over a plurality of downlink optical fiber communications mediums 905D(1)-905D(R) to a plurality of remote units 912(1)-912(R). In a non-limiting example, at least one of the remote units 912(1)-912(R) is functionally equivalent to the PCRs 302(1)-302(N) of FIG. 3. O-E converters provided in the remote units 912(1)-912(R) (e.g., provided in or coupled to the network interface circuit 502) convert the downlink optical communications signals 910D-O(1)-910D-O(C) back into the downlink RF communications signals 910D-E(1)-910D-E(C), which are provided to antennas 916(1)-916(R) in the remote units 912(1)-912(R) to user equipment (not shown) in the reception range of the antennas 916(1)-916(R).

E-O converters are also provided in the remote units 912(1)-912(R) to convert uplink RF communications signals 910U-E(1)-910U-E(R) received from user equipment through the antennas 916(1)-916(R) into uplink optical communications signals 910U-O(1)-910U-O(R). The remote units 912(1)-912(R) communicate uplink optical communications signals 910U-O(1)-910U-O(R) over a plurality of uplink optical fiber communications mediums 905U(1)-905U(R) to the OIMs 908(1)-908(W) in the central unit 904. The OIMs 908(1)-908(W) include O-E converters that convert the received uplink optical communications signals 910U-O(1)-910U-O(R) into uplink RF communications signals 910U-E(1)-910U-E(R), which are processed by the RIMs 902(1)-902(J) and provided as uplink RF communications signals 910U-E(1)-910U-E(R).

Note that the downlink optical fiber communications mediums 905D(1)-905D(R) and uplink optical fiber communications mediums 905U(1)-905U(R) connected to each remote unit 912(1)-912(R) may be a common optical fiber communications medium, wherein for example, wave division multiplexing (WDM) may be employed to provide the downlink optical communications signals 910D-O(1)-910D-O(C) and the uplink optical communications signals 910U-O(1)-910U-O(R) on the same optical fiber communications medium.

Figure 10A:
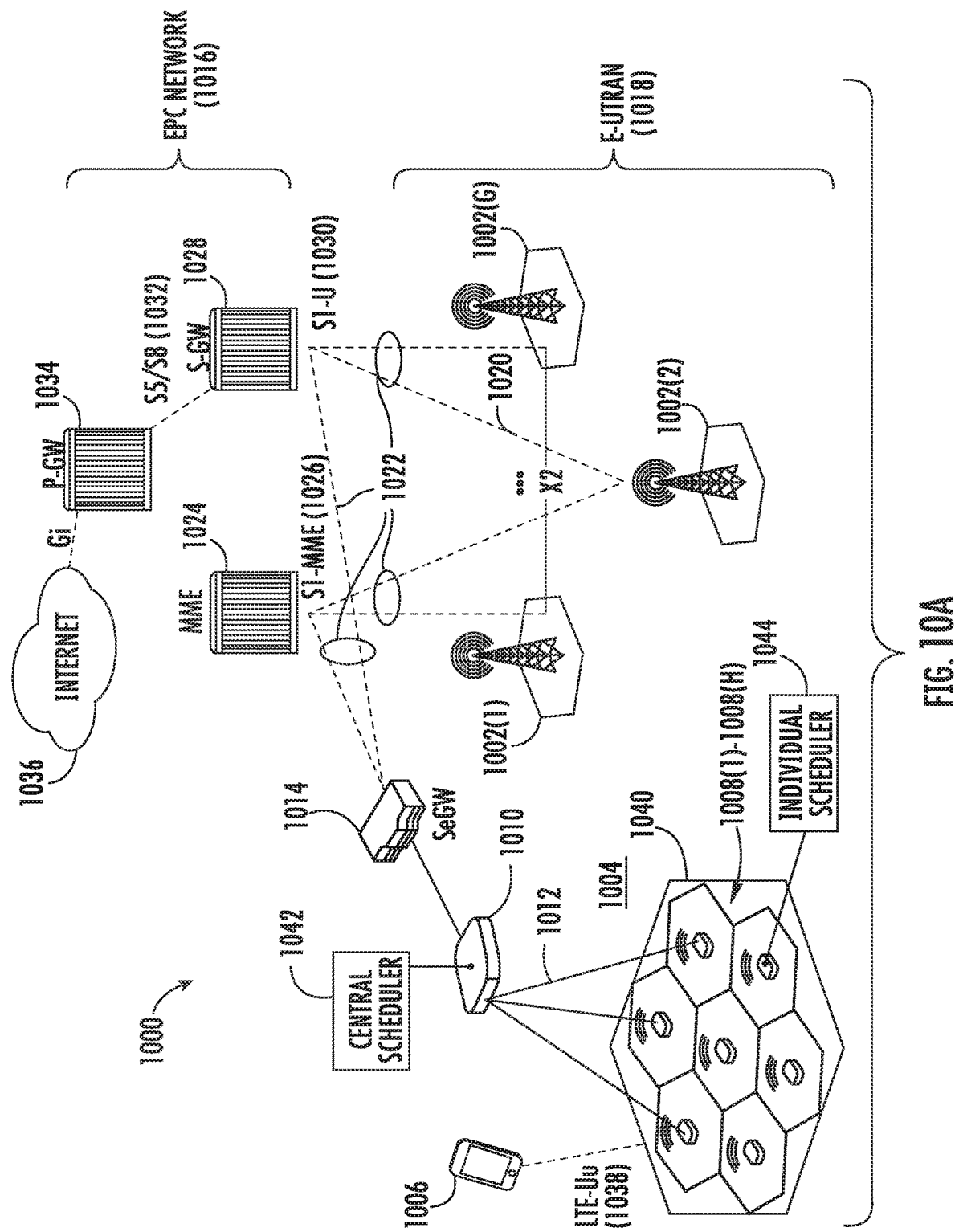
FIGS. 10A and 10B illustrate an exemplary mobile telecommunications environment that includes an exemplary macrocell radio access network (RAN) and an exemplary small cell RAN, some or all of which may be included in the PCR network of FIGS. 3-9.
Figure 10B:
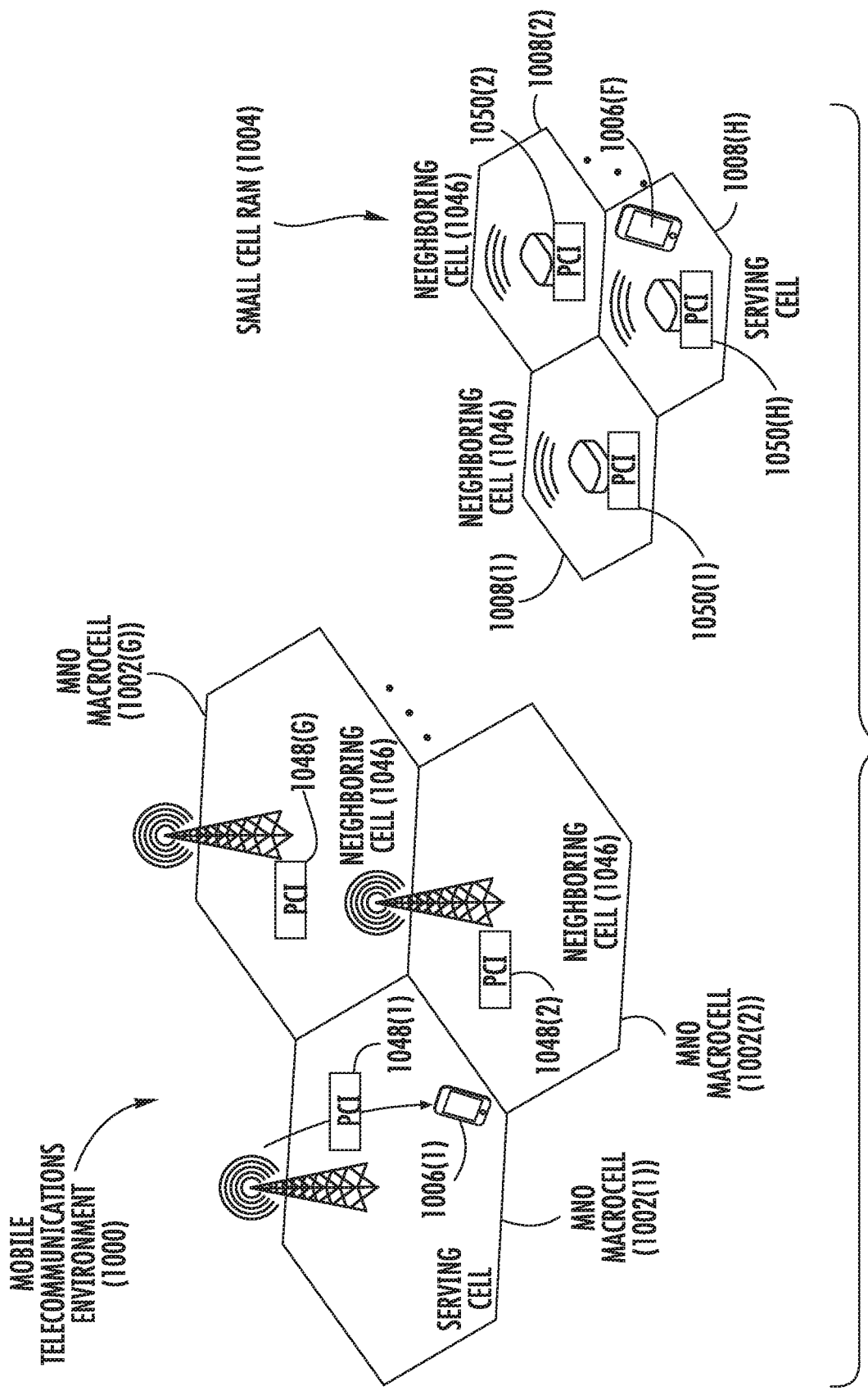

The PCRs 302(1)-302(N) of FIGS. 3-9 can be provided in a radio access network (RAN) which interfaces with a mobile network operator (MNO) or other telecommunications network, as depicted in FIGS. 10A and 10B. FIG. 10A is a schematic diagram of an exemplary mobile telecommunications environment 1000 (also referred to as "environment 1000") that includes exemplary macrocell RANs 1002(1)-1002(G) ("macrocells 1002(1)-1002(G)") and an exemplary small cell RAN 1004, which may include one or more components of the PCR network 300 in FIGS. 3-9. The small cell RAN 1004 is configured to service mobile communications between a user mobile communications device 1006 (which may be one of the client devices 304(1)-304(M)) to a MNO.

In this regard, with reference to FIG. 10A, the mobile telecommunications environment 1000 in this example is arranged as a Long Term Evolution (LTE) system as described by the Third Generation Partnership Project (3GPP) as an evolution of the Global System for Mobile Communication/Universal Mobile Telecommunications System (GSM/UMTS) standards. It is emphasized, however, that the aspects described herein may also be applicable to other network types and protocols. The mobile telecommunications environment 1000 includes the small cell RAN 1004, which includes a plurality of small cell radio nodes 1008(1)-1008(H), each of which may be or include a PCR 302(1)-302(N) of FIG. 3. Each small cell radio node 1008(1)-1008(H) has a radio coverage area (graphically depicted in FIGS. 10A and 10B as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

In FIG. 10A, the small cell RAN 1004 includes one or more services nodes (represented as a single services node 1010 in FIG. 10A) that manage and control the small cell radio nodes 1008(1)-1008(H). In some examples, the services node 1010 may be or include the central unit 314 of FIG. 3. In alternative implementations, the management and control functionality may be incorporated into the small cell radio nodes 1008(1)-1008(H), distributed among nodes, or implemented remotely (i.e., using infrastructure external to the small cell RAN 1004). The small cell radio nodes 1008(1)-1008(H) are coupled to the services node 1010 over a direct or local area network (LAN) connection 1012 as an example, typically using secure IPsec tunnels. The services node 1010 aggregates voice and data traffic from the small cell radio nodes 1008(1)-1008(H) and provides connectivity over an IPsec tunnel to a security gateway (SeGW) 1014 in an Evolved Packet Core (EPC) network 1016 of the MNO.

Some or all of the macrocells 1002(1)-1002(G) can also be an Evolved Node B (eNB) base station. The radio coverage area of a macrocell 1002(1)-1002(G) is typically much larger than that of a small cell RAN 1004 where the extent of coverage often depends on the base station configuration and surrounding geography. Thus, a given user mobile communications device 1006 in the small cell RAN 1004 may achieve connectivity to the EPC network 1016 through either a macrocell 1002(1)-1002(G) or a small cell radio node 1008(1)-1008(H) in the small cell RAN 1004 in the environment 1000.

Along with the macrocells 1002(1)-1002(G), the small cell RAN 1004 forms an access network (i.e., an Evolved UMTS Terrestrial Radio Access Network (E-UTRAN)) under 3GPP as represented by reference numeral 1018. As shown in FIG. 10A, there is no centralized controller in the E-UTRAN 1018, hence an LTE network architecture is commonly said to be "flat." Macrocells 1002(1)-1002(G) are typically interconnected using an X2 interface 1020. The macrocells 1002(1)-1002(G) are also typically connected to the EPC network 1016 by means of an S1 interface 1022. More particularly, the macrocells 1002(1)-1002(G) are connected to a Mobility Management Entity (MME) 1024 in the EPC network 1016 using an S1-MME interface 1026, and to a Serving Gateway (S-GW) 1028 using an S1-U interface 1030. An S5/S8 interface 1032 couples the S-GW 1028 to a Packet Data Network Gateway (P-GW) 1034 in the EPC network 1016 to provide the user mobile communications devices 1006 with connectivity to the Internet 1036. A user mobile communications device 1006 can connect to the small cell radio nodes 1008(1)-1008(H) in the small cell RAN 1004 over an LTE-Uu interface 1038.

The S1-MME interface 1026 is also connected to the MME 1024 and S-GW 1028 in the EPC network 1016 using the appropriate S1 interface connections 1022. Accordingly, as each of the small cell radio nodes 1008(1)-1008(H) in the small cell RAN 1004 is operatively coupled to the services node 1010 over the LAN connection 1012, the communications connections from the small cell radio nodes 1008(1)-1008(H) are aggregated to the EPC network 1016. Such aggregation preserves the flat characteristics of the LTE network while reducing the number of S1 interface connections 1022 that would otherwise be presented to the EPC network 1016. Thus, the small cell RAN 1004 essentially appears as a single eNB 1040 to the EPC network 1016, as shown. The services node 1010 in the small cell RAN 1004 includes a central scheduler 1042. The small cell radio nodes 1008(1)-1008(H) may also be configured to support individual schedulers 1044.

As a user mobile communications device 1006 moves throughout the environment 1000, the user mobile communications device 1006 will actively or passively monitor a cell in a macrocell 1002(1)-1002(G) which is within communications range of the user mobile communications device 1006. As shown in FIG. 10B, such a cell is termed the "serving cell." For example, if a user mobile communications device 1006(1)-1006(F) is in communication through an established communications session with a particular small cell radio node 1008(1)-1008(H) in the small cell RAN 1004, the particular small cell radio node 1008(1)-1008(H) will be the serving cell to the user mobile communications device 1006(1)-1006(F), and the small cell RAN 1004 will be the serving RAN. The user mobile communications device 1006(1)-1006(F) will continually evaluate the quality of a serving cell as compared with that of a neighboring cell 1046 in the small cell RAN 1004 and/or the macrocells 1002(1)-1002(G), as shown in FIG. 10B. A neighboring cell 1046 is a cell among the small cell RAN 1004 and/or macrocells 1002(1)-1002(G) that is not in control of the active communications session for a given user mobile communications device 1006(1)-1006(F), but is located in proximity to a serving cell to a user mobile communications device 1006(1)-1006(F) such that the user mobile communications device 1006(1)-1006(F) could be in communications range of both its serving cell and the neighboring cell 1046. Both the small cell radio nodes 1008(1)-1008(H) and the macrocells 1002(1)-1002(G) can identify themselves to a user mobile communications device 1006(1)-1006(F) using a respective unique Physical Cell Identity (PCI) 1048(1)-1048(G), 1050(1)-1050(H) (e.g., a public land mobile network (PLMN) identification (ID) (PLMN ID)) that is transmitted over a downlink user mobile communications device 1006(1)-1006(F). Each of the small cell radio nodes 1008(1)-1008(H) and the macrocells 1002(1)-1002(G) can assign a physical channel identity (PCI) that allows the user mobile communications device 1006(1)-1006(F) to distinguish adjacent cells. As such, the PCIs 1048(1)-1048(G), 1050(1)-1050(H) are uniquely assigned among neighboring cells 1046, but can be reused across geographically separated cells.

Figure 11:
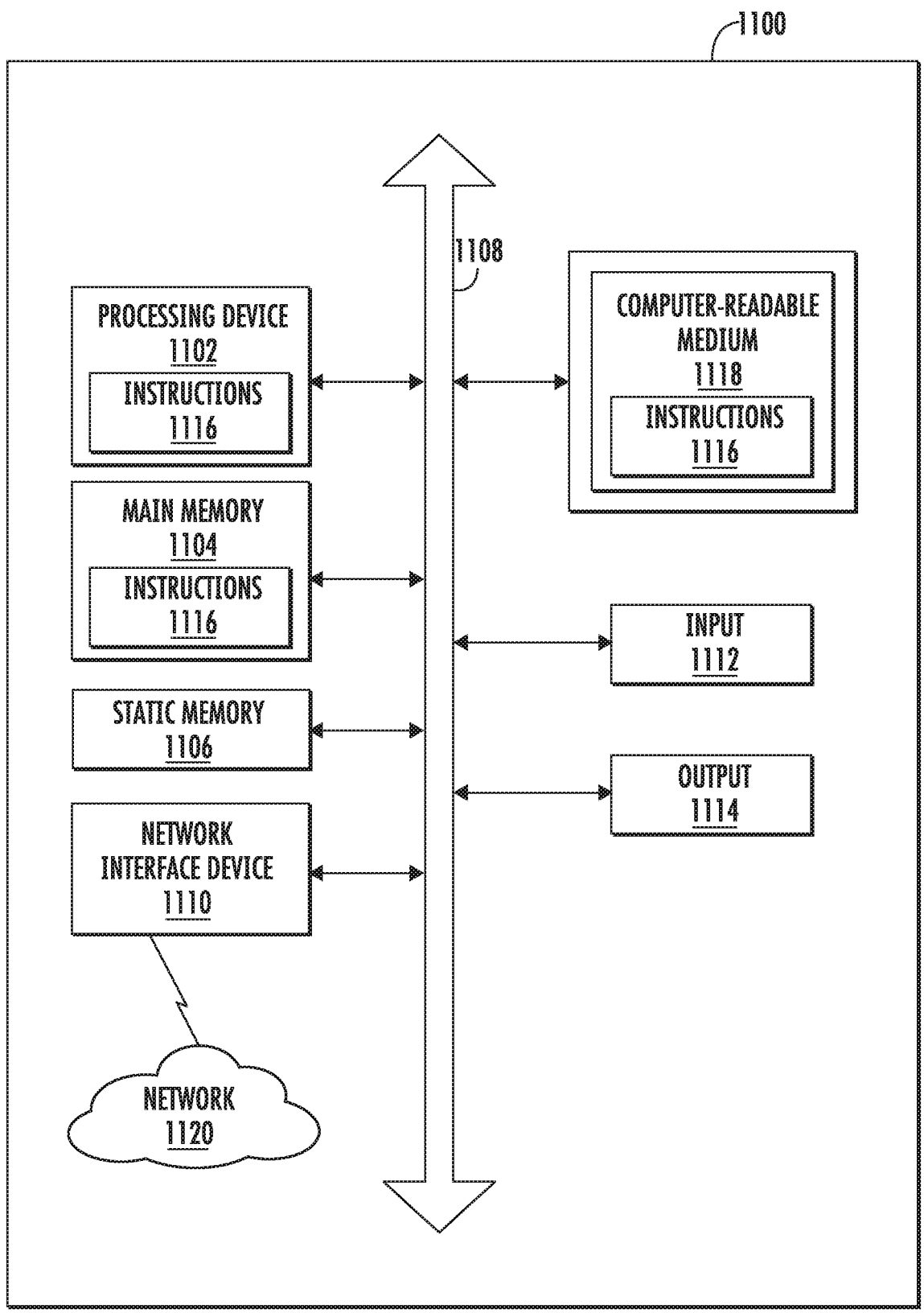
FIG. 11 is a schematic diagram of a generalized representation of an exemplary computer system that can be included in a PCR provided in the PCR network of FIGS. 3-10B, wherein the exemplary computer system is adapted to execute instructions from an exemplary computer readable medium.

FIG. 11 is a schematic diagram of a generalized representation of an exemplary computer system that could be employed in any component in the PCR network 300 in FIGS. 3-10B, including but not limited to the PCRs 302(1)-302(N) and/or central unit 314, for distributing pathside information among client devices 304(1)-304(M). In this regard, the computer system 1100 is adapted to execute instructions from an exemplary computer-readable medium to perform these and/or any of the functions or processing described herein.

In this regard, the computer system 1100 in FIG. 11 may include a set of instructions that may be executed to program and configure programmable digital signal processing circuits in a PCR network 300 for distributing pathside information among PCRs 302(1)-302(N) and client devices 304(1)-304(M). The computer system 1100 (e.g., the computer system 506 of FIG. 5A) may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1100 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 1100 in this embodiment includes a processing device (e.g., processing circuit 508) or processor 1102, a main memory 1104 (e.g., read-only memory (ROM), flash memory, dynamic random access memory (DRAM), such as synchronous DRAM (SDRAM), etc.), and a static memory 1106 (e.g., flash memory, static random access memory (SRAM), etc.), which may communicate with each other via a data bus 1108. Alternatively, the processor 1102 may be connected to the main memory 1104 and/or static memory 1106 directly or via some other connectivity means. The processor 1102 may be a controller circuit, and the main memory 1104 or static memory 1106 may be any type of memory. In an exemplary aspect, the processor 1102 may store pathside data, network data, or other information to be distributed to client devices 304(1)-304(M) or the PCR network 300 in at least one of the main memory 1104 or the static memory 1106.

The processor 1102 represents one or more general-purpose processing devices, such as a microprocessor, central processing unit, or the like. More particularly, the processor 1102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1102 is configured to execute processing logic in instructions for performing the operations and steps discussed herein.

The computer system 1100 may further include a network interface device 1110 (e.g., the network interface circuit 502 in FIG. 5A). The computer system 1100 also may or may not include an input 1112, configured to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processor 1102 during execution thereof by the computer system 1100, the main memory 1104, and the processor 1102 also constituting computer-readable medium. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

It will be apparent to those skilled in the art that various modifications and variations can be made without departing from the spirit or scope of the invention.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed wireless communications systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller circuit may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

What is claimed is:

1. A pathside communication relay (PCR), comprising:
   a communication interface circuit configured to establish a communication coverage area;
   a network interface circuit;
   a sensor interface circuit configured to couple to a sensor; and
   a processing circuit configured to:
      receive client data from a client device within the communication coverage area over the communication interface circuit;
      receive network data from an additional PCR through the network interface circuit, the network data comprising remote client data from a remote client device in communication with the additional PCR;
      receive sensor data from the sensor through the sensor interface circuit;
      cause pathside data to be generated, wherein the pathside data comprises a portion of the client data, a portion of the network data, and a portion of the sensor data; and
      transmit the pathside data within the communication coverage area through the communication interface circuit.

2. The PCR of claim 1, wherein:
   the communication interface circuit comprises a radio frequency (RF) transmitter circuit and an RF receiver circuit;
   the communication coverage area comprises an RF coverage area; and
   the RF receiver circuit is configured to receive the client data directly from the client device.

3. The PCR of claim 2, wherein the RF transmitter circuit and the RF receiver circuit comprise cellular radio circuitry.

4. The PCR of claim 2, wherein the RF transmitter circuit is configured to broadcast the pathside data within the RF coverage area over an intelligent transportation systems (ITS) frequency channel.

5. The PCR of claim 1, wherein:
   the communication coverage area comprises a first region of a vehicle path; and
   the client device comprises a first vehicle within the first region of the vehicle path.

6. The PCR of claim 5, wherein the pathside data is generated by:
   determining a relevant portion of the client data and the sensor data for a second vehicle in the first region of the vehicle path; and
   including the relevant portion of the client data and the sensor data in the pathside data.

7. The PCR of claim 6, wherein the client data indicates at least one of a first position, a first speed, an orientation, or an operating status of the first vehicle derived from the client data.

8. The PCR of claim 7, wherein determining the relevant portion of the client data is based on at least one of a second position or a second speed of the second vehicle relative to the first position or the first speed of the first vehicle.

9. The PCR of claim 5, wherein the additional PCR is adjacent a second region of the vehicle path and the remote client device is a second vehicle.

10. The PCR of claim 9, wherein the network data is received from the additional PCR through at least one of a central unit or a cloud server communicatively coupled to the network interface circuit.

11. The PCR of claim 5, wherein the vehicle path comprises a road and the first vehicle comprises an automobile.

12. The PCR of claim 5, wherein the vehicle path comprises at least one of a waterway for boats or ships, a sidewalk for pedestrians, a trail for pedestrians or bicycles, or airspace for an unmanned aerial vehicle.

13. The PCR of claim 1, wherein the sensor data comprises at least one of:
   image data received from a camera coupled to the sensor interface circuit;
   object location data received from at least one of a LIDAR, RADAR, or ultrasonic device coupled to the sensor interface circuit;
   traffic data received from a traffic monitoring device coupled to the sensor interface circuit; or
   ambient conditions received from an environmental sensor coupled to the sensor interface circuit.

14. The PCR of claim 1, further comprising a network interface circuit configured to couple to an infrastructure server;
   wherein the processing circuit is further configured to receive from the infrastructure server an indication of a change in a path condition.

15. The PCR of claim 14, wherein the path condition comprises at least one of an approach of an emergency vehicle, an approach of a train, a roadway closure, construction information, a snow condition, an ice condition, a flood condition, or an emergency message.

16. The PCR of claim 1, wherein the pathside data comprises position, speed, and orientation information of client devices in the communication coverage area extracted from additional client data received from the client devices over the communication interface circuit.

17. The PCR of claim 16, wherein the pathside data omits identifying information associated with the client devices.

18. The PCR of claim 1, further comprising a network interface circuit configured to receive a downlink communications signal comprising at least one of cellular data or internet data;
   wherein the communication interface circuit is further configured to distribute the received downlink communications signal within the communication coverage area.

19. The PCR of claim 18, wherein the network interface circuit is coupled to an optical-to-electrical (O-E) converter configured to convert an optical communications signal into the downlink communications signal.

20. The PCR of claim 1, wherein the client data is received via a Dedicated Short-Range Communications (DSRC) signal using 802.11p Wireless Access to Vehicular Environments (WAVE) protocol from the client device.

21. The PCR of claim 1, wherein the client data is received via a Cellular-Vehicle to everything (Cellular-V2X) signal using Cellular-V2X communication protocol from the client device.

22. The PCR of claim 1, further comprising a memory coupled to the processing circuit and configured to store the pathside data.

23. A method for communicating with client devices within a vehicle path, the method comprising:
   receiving client data from a first client device within the vehicle path over a wireless communication medium;
   receiving sensor data from a sensor;
   receiving network data from a pathside communication relay (PCR) through a network interface, the network data comprising remote client data from a remote client device in communication with the PCR;
   producing pathside data comprising a portion of the client data, a portion of the remote client data, and a portion of the sensor data; and
   transmitting the pathside data to a region of the vehicle path.

24. The method of claim 23, wherein producing the pathside data comprises determining a relevant portion of the client data, the remote client data, and the sensor data for a second client device within the path.

25. The method of claim 23, wherein producing the pathside data comprises:
   generating a map of client devices from the client data, the remote client data, and the sensor data; and
   including the map in the pathside data.

26. The method of claim 23, wherein:
   the first client device comprises a first vehicle; and
   producing the pathside data comprises analyzing at least one of a position, a speed, an orientation, or an operating status of the first vehicle to predict potential collision events; and
   the method further includes transmitting an alert when a collision event between the first vehicle and a second vehicle is predicted.

27. The method of claim 23, wherein:
   the first client device comprises a first vehicle; and
   producing the pathside data comprises analyzing at least one of a position, a speed, an orientation, or an operating status of the first vehicle to predict an alert condition; and
   the method further includes transmitting an alert when the alert condition is predicted.

* * * * *